US012573561B2

(12) United States Patent
Suzuki et al.

(10) Patent No.: US 12,573,561 B2
(45) Date of Patent: Mar. 10, 2026

(54) MULTILAYER ELECTRONIC COMPONENT

(71) Applicant: KYOCERA CORPORATION, Kyoto (JP)

(72) Inventors: Tatsuya Suzuki, Kirishima (JP); Hirotoshi Kii, Kirishima (JP); Atsushi Miyabayashi, Aira (JP); Kenta Nakashima, Kirishima (JP); Satoru Naokawa, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 19/199,872

(22) Filed: May 6, 2025

(65) Prior Publication Data

US 2025/0273400 A1     Aug. 28, 2025

Related U.S. Application Data

(63) Continuation-in-part of application No. PCT/JP2024/039043, filed on Nov. 1, 2024.

(30) Foreign Application Priority Data

Dec. 1, 2023   (JP) ................................. 2023-203865
Feb. 6, 2024   (JP) ................................. 2024-016211

(51) Int. Cl.
H01G 4/30        (2006.01)
H01G 4/224       (2006.01)
H01G 4/232       (2006.01)

(52) U.S. Cl.
CPC .............. *H01G 4/30* (2013.01); *H01G 4/224* (2013.01); *H01G 4/232* (2013.01)

(58) Field of Classification Search
CPC ............ H01G 4/30; H01G 4/12; H01G 4/248; H01G 4/005; H01G 4/224; H10G 4/232
(Continued)

(56) References Cited

U.S. PATENT DOCUMENTS 5,388,024  A  *  2/1995  Galvagni  ................. H01G 4/30
                                              29/25.42
10,403,437  B2 *  9/2019  Kowase  ................. H01G 4/232
(Continued)

FOREIGN PATENT DOCUMENTS

JP        S63-086414 A      4/1988
JP        2000-049032 A     2/2000
(Continued)

*Primary Examiner* — Arun Ramaswamy
(74) *Attorney, Agent, or Firm* — Volpe Koenig

(57)                ABSTRACT

In a multilayer electronic component, an effective part includes alternately stacked dielectric layers and internal electrodes. A cover overlaps the effective part from a first side in the stacking direction. A base electrode overlaps the cover from the first side. The effective part has an end surface facing a third side, among third and fourth sides, in a first direction intersecting the stacking direction. Multiple internal electrodes each include an exposed edge exposed from the end surface. At least some of the exposed edges have different positions in the first direction. The base electrode is located in a third-side region of a first-side surface of the cover. A position of the exposed edge located farthest toward the fourth side is an innermost position. A third-side edge of the base electrode is located at the innermost position or farther toward the fourth side than the innermost position.

20 Claims, 7 Drawing Sheets

(58) Field of Classification Search
USPC ................................... 361/301.4, 321.1, 303
See application file for complete search history.

(56) References Cited

U.S. PATENT DOCUMENTS

| | | | |
|---|---|---|---|
| 11,476,053 B2* | 10/2022 | Nishikawa ............. | H01G 13/00 |
| 2010/0302704 A1 | 12/2010 | Ogawa et al. | |
| 2017/0345569 A1* | 11/2017 | Sakatsume ............. | H01G 4/012 |
| 2018/0182551 A1* | 6/2018 | Ahn ......................... | H01G 4/12 |
| 2021/0241976 A1* | 8/2021 | Nakano .................. | H01G 11/26 |
| 2023/0018369 A1 | 1/2023 | Tominaga et al. | |
| 2023/0207221 A1* | 6/2023 | Seo ......................... | B23K 26/38 |

FOREIGN PATENT DOCUMENTS

| | | | |
|---|---|---|---|
| JP | 2010-278373 A | 12/2010 | |
| JP | 2023-013421 A | 1/2023 | |
| WO | 2024/176578 A1 | 8/2024 | |

* cited by examiner

MULTILAYER ELECTRONIC COMPONENT

CROSS REFERENCE TO RELATED APPLICATIONS

The present application is a Continuation-in-Part of International Application No. PCT/JP2024/039043 filed on Nov. 1, 2024, which claims priority to Japanese Patent Application Numbers 2023-203865 filed Dec. 1, 2023 and 2024-016211 filed Feb. 6, 2024, the contents of all of which are incorporated herein by reference in their entirety as if fully set forth.

BACKGROUND OF THE INVENTION

1. Field of the Invention

The present disclosure relates to a multilayer electronic component such as a multilayer ceramic capacitor.

2. Description of the Related Art

Multilayer ceramic capacitors are known examples of multilayer electronic components (see, for example, below mentioned Japanese Unexamined Patent Application Publication Nos. 2000-49032 and 2023-13421). A multilayer ceramic capacitor includes, for example, a body that is directly responsible for the capacitor function and external electrodes for mounting the capacitor on a circuit board or the like. The body includes dielectric layers and flat-plate-shaped internal electrodes stacked in an alternating manner. Edges of the internal electrodes are exposed from side surfaces (surfaces along the stacking direction) of the body. The external electrodes consist of metal layers, for example, and cover the side surfaces of the body, as well as regions of the top surface and bottom surface of the body that are close to the side surfaces.

Japanese Unexamined Patent Application Publication No. 2000-49032 discloses a capacitor in which the side surfaces of a body of the capacitor are formed in a recessed shape. In Japanese Unexamined Patent Application Publication No. 2023-13421, base electrodes are provided on the side surfaces and the top and bottom surfaces of the body, and metal is deposited on the base electrodes by plating to form external electrodes.

SUMMARY OF THE INVENTION

In an embodiment of the present disclosure, a multilayer electronic component includes an effective part, a first cover, and a first base electrode. The effective part includes dielectric layers and internal electrodes stacked in an alternating manner in a stacking direction. The first cover overlaps the effective part from a first side, out of a first side and a second side, in the stacking direction. The first base electrode overlaps the first cover from the first side. The effective part has an end surface facing a third side, out of a third side and a fourth side, in a first direction intersecting the stacking direction. A plurality of the internal electrodes includes two or more internal electrodes that each include an exposed edge exposed from the end surface. The first base electrode is located in a region, on the third side, of a surface, on the first side, of the first cover.

In an example, at least some of the exposed edges are located at different positions from each other in the first direction. When a position of the exposed edge located farthest toward the fourth side, among the plurality of exposed edges, is referred to as an innermost position, an edge, on the third side, of the first base electrode is located at an identical position to the innermost position or farther toward the fourth side than the innermost position.

In an example, a first end surface, on the third side, of the first base electrode is inclined with respect to the stacking direction such that the first end surface approaches the fourth side while approaching the first side.

BRIEF DESCRIPTION OF THE DRAWINGS

FIG. 3 is a cross-sectional view taken along line III-III in FIG. 1;

DESCRIPTION OF THE PREFERRED EMBODIMENTS

Figure 1:
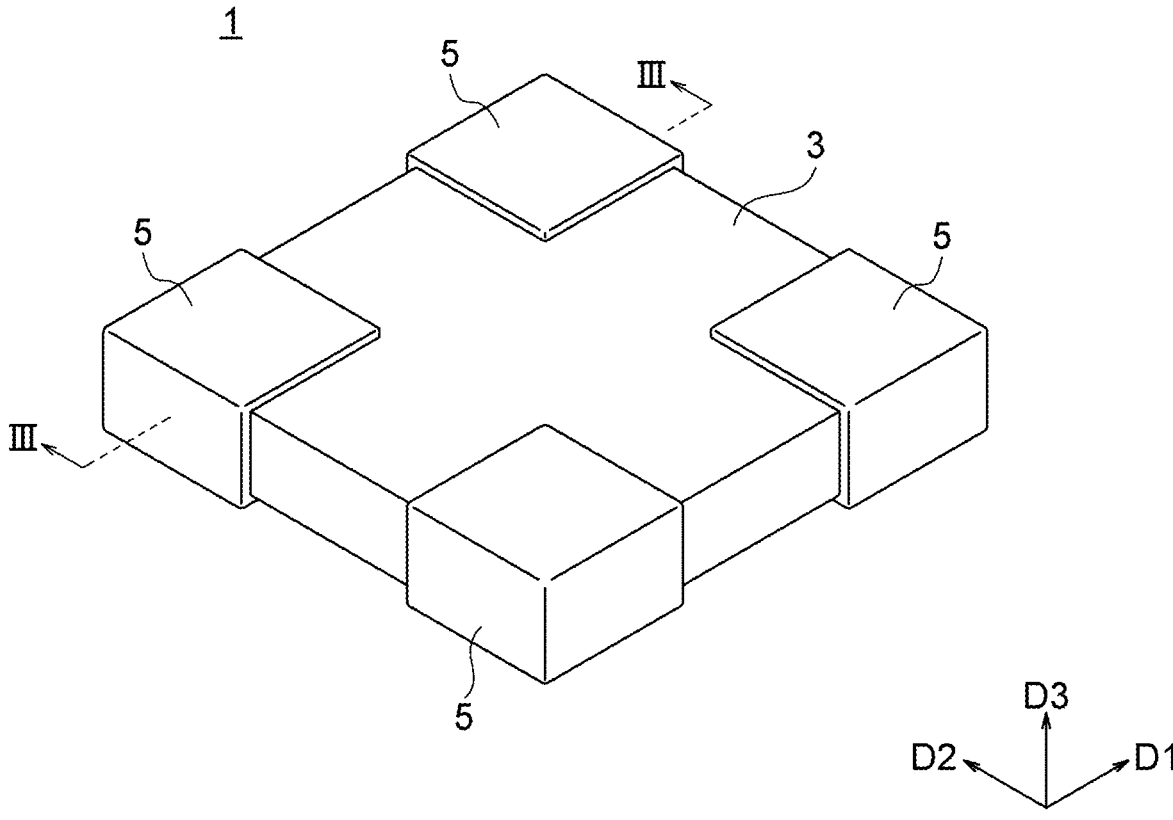
FIG. 1 is a perspective view illustrating a capacitor according to a First Embodiment.

Hereinafter, embodiments according to the present disclosure will be described in detail while referring to the drawings. The drawings used in the following description are schematic drawings. Therefore, the dimensional ratios and so forth in the drawings do not necessarily match the actual dimensional ratios and so forth. There may be cases where the dimensional ratios and so forth do not match from drawing to drawing. Certain shapes or dimensions etc. may be depicted in an exaggerated fashion, and details may be omitted. However, this does not deny that the actual shapes and/or dimensions may be as illustrated in the drawings, or that features of the shapes and/or dimensions may be extracted from the drawings.

In the description of aspects described relatively later, basically, only the differences from the relatively previously described aspects will be described. Matters not specifically mentioned may be assumed to be the same as or similar to those in previously described aspects or may be inferred from the previously described aspects. For the sake of convenience, the same symbols may be used for components that correspond to each other in different aspects, even if there are differences.

In the following description, when "rectangles" (or "rectangular shapes"), "squares" (or "square shapes"), and "oblongs" (or "oblong shapes") are referred to, the corners of these shapes may be chamfered with curved surfaces, etc., as long as the concepts of the shapes remain valid. For example, a corner formed by two sides may be chamfered by a length less than or equal to $\frac{1}{5}$, $\frac{1}{10}$ or $\frac{1}{20}$ of the length of the shorter of the two sides. When viewed microscopically, naturally, the corners may be rounded due to the manufacturing precision (error). This also applies to other polygonal shapes etc.

When we refer to the thickness of various layers, unless otherwise noted, the thickness refers to the thickness of a part having a constant thickness. For example, as described below, a base electrode is basically a layer having a constant thickness, but may have a form in which the thickness can be considered to vary at the end portions thereof. However, when we say that a base electrode is thicker than an internal electrode, such changes in the thickness of the end portions are not taken into consideration, unless otherwise noted.

Overview of Embodiments

FIG. 1 is a perspective view illustrating a capacitor 1 (an example of a multilayer electronic component) according to a First Embodiment. A Cartesian coordinate system D1D2D3 is added to FIG. 1 and other drawings referred to below for convenience. The capacitor 1 may be used with either side being regarded as a top side or a bottom side. However, in the description of the embodiments, the +D3 side may be regarded as up, and terms such as top surface and bottom surface may be used for convenience.

The capacitor 1 is, for example, a multilayer ceramic capacitor. The capacitor 1 includes a substantially rectangular-parallelepiped-shaped body 3 and four external electrodes 5 located at the four corners of the body 3 in plan view (looking in the D3 direction). The external electrodes 5 contribute to electrically connecting the capacitor 1 to another electronic component (for example, a circuit board, which is not illustrated).

Figure 3:
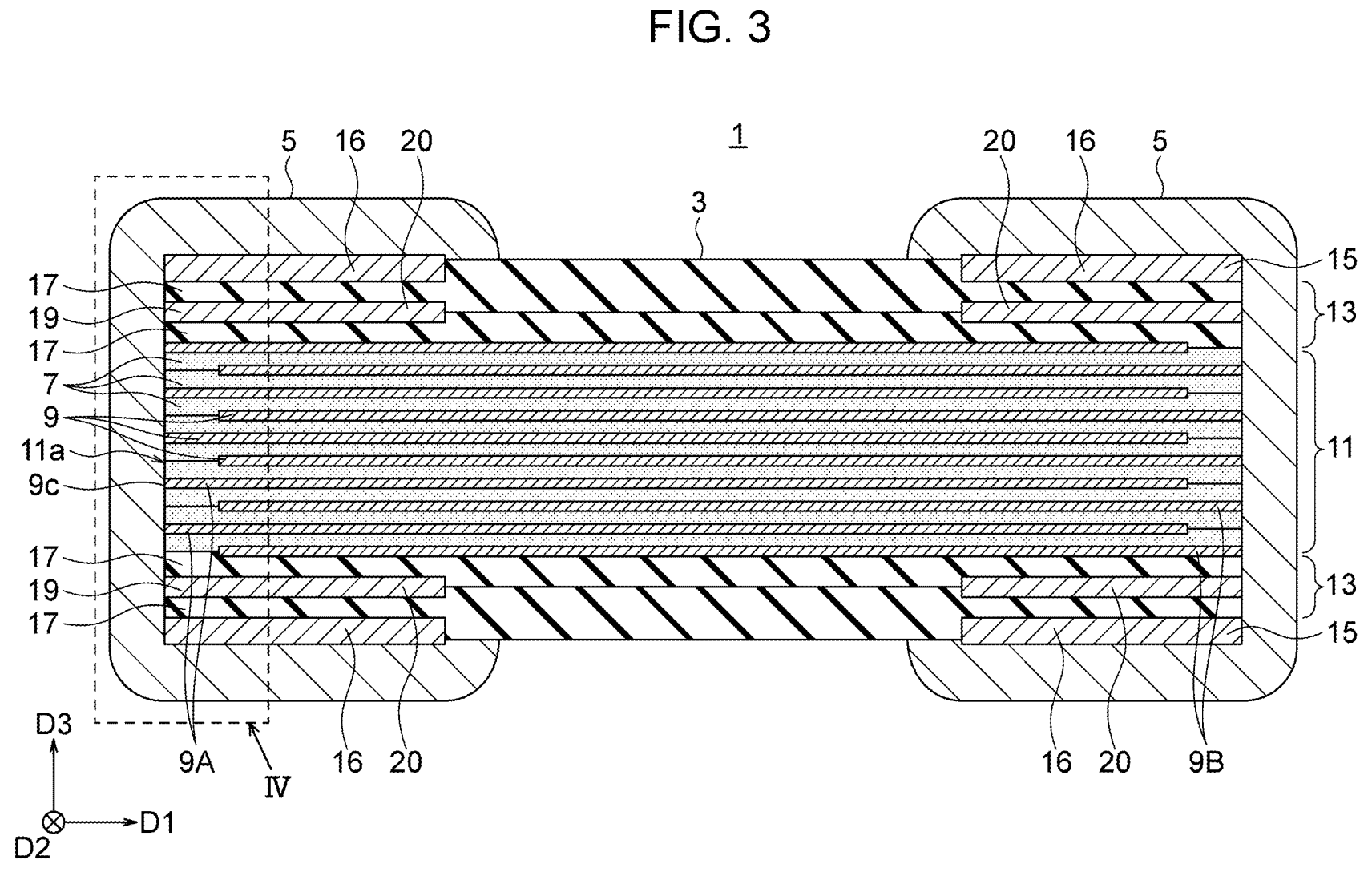

FIG. 3 is a cross-sectional view taken along line III-III in FIG. 1. FIG. 3 illustrates a D1D3 cross section that cuts through the external electrodes 5 on the +D2 side. However, a D1D3 cross section that cuts through the external electrodes 5 on the −D2 side, a D2D3 cross section that cuts through the external electrodes 5 on the −D1 side, and a D2D3 cross section that cuts the external electrodes 5 on the +D1 side would be basically identical. In the description of the embodiments, for convenience, the positional relationships between components will be described using terms D1, D2, and D3 assuming the cross section illustrated in FIG. 3 unless otherwise specified.

The body 3, for example, includes an effective part 11, two covers 13 that overlap the top surface and the bottom surface of the effective part 11, and base layers 15 that overlap the surfaces of the covers 13 on the opposite side from the effective part 11. The effective part 11 includes multiple dielectric layers 7 and multiple internal electrodes 9 stacked in an alternating manner. The multiple internal electrodes 9 include multiple first internal electrodes 9A and multiple second internal electrodes 9B. Each base layer 15 includes four base electrodes 16 at positions corresponding to the positions of the four external electrodes 5, for example.

The effective part 11 is directly responsible for the capacitor function. The covers 13, for example, contribute to protecting and improving the strength of the body 3. The base electrodes 16 contribute to, for example, deposition of the metal that will become the external electrodes 5 using a plating method and/or to improving the adherence of the external electrodes 5 to the body 3.

Among the outer surfaces of the effective part 11, the side surface that faces toward the −D1 side will be referred to as an end surface 11c. The −D1 side may be referred to as one side (example of a third side) in a direction (D1 direction) that intersects the stacking direction (D3 direction) of the dielectric layers 7 and the internal electrodes 9. Part of an edge of each first internal electrode 9A (may be referred to as an exposed edge 9c) is exposed from the end surface 11c. The external electrode 5 on the −D1 side covers the end surface 11c and is adhered to the exposed edges 9c. Thus, the first internal electrodes 9A and the external electrode 5 are electrically connected to each other.

Figure 4:
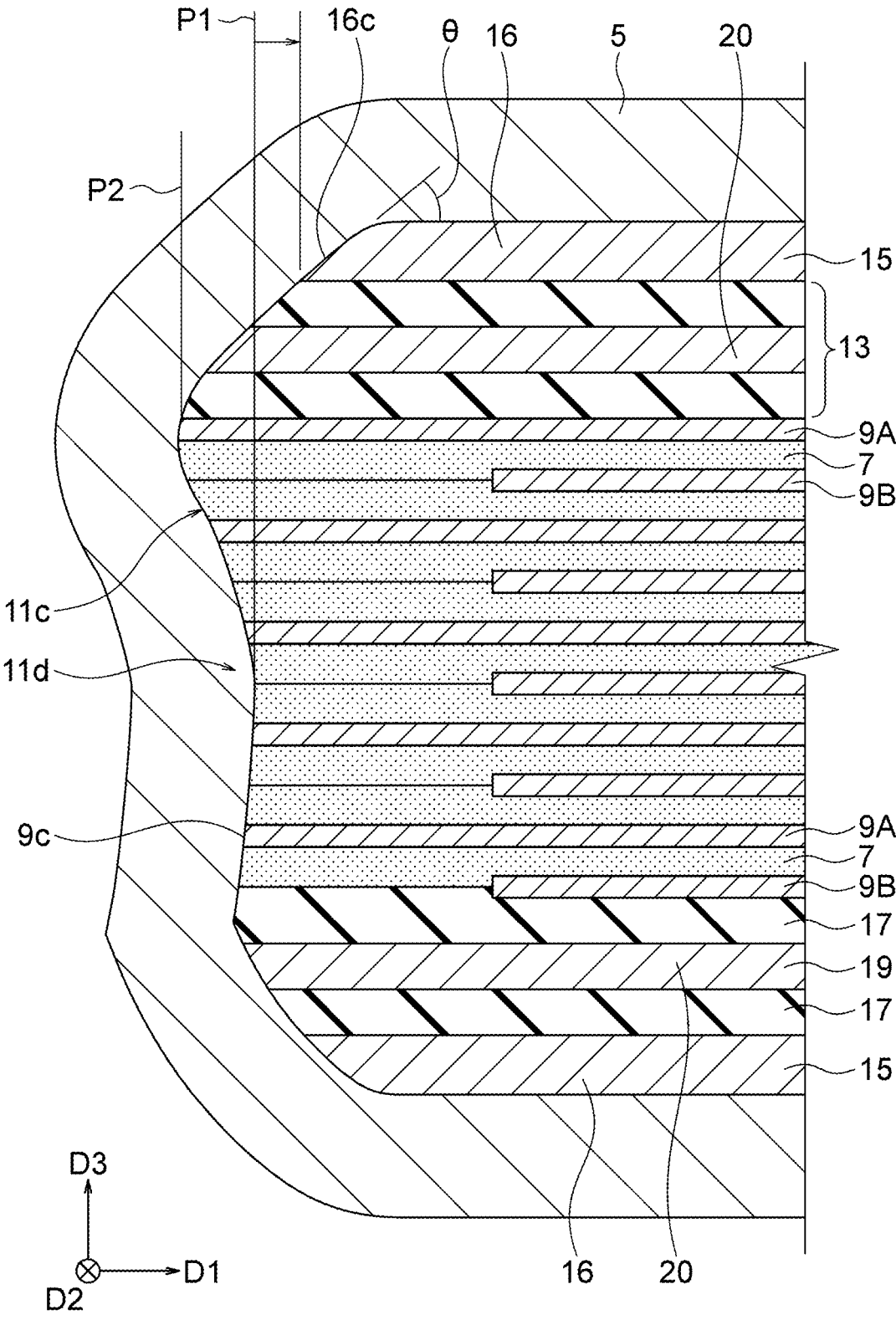
FIG. 4 is an enlarged view of a region IV in FIG. 3.

FIG. 4 is an enlarged view of a region IV in FIG. 3. The end surface 11c includes a recessed portion 11d that is recessed toward the +D1 side. As a result, at least some (two or more) of the exposed edges 9c of the multiple first internal electrodes 9A are located at different positions from each other in the D1 direction. The position of the exposed edge 9c located farthermost toward the +D1 side (an example of a fourth side), among the multiple exposed edges 9c, will be referred to as an innermost position P1. Here, the −D1-side edge of the base electrode 16 on the +D3 side (and −D1 side) (an example of a first base electrode) is located at the same position as the innermost position P1 or farther toward the +D1 side than the innermost position P1. This also applies to the base electrode 16 on the −D3 side (and −D1 side) (example of second base electrode).

In such a configuration, for example, the likelihood of a protrusion 5z (see FIG. 7) being formed on the external electrode 5 is reduced, as will be described in detail later. As a result, for example, when mounting the capacitor 1 on a circuit board, which is not illustrated, the likelihood of bad alignment occurring due to the protrusion 5z is reduced. In addition, for example, the likelihood of the capacitor 1 being subjected to unintended forces from the circuit board is reduced when a suction nozzle that picked up the capacitor 1 is lowered toward the circuit board. Therefore, the probability of cracks occurring in the external electrode 5 is reduced.

A feature that is different from the above positional relationship of the base electrode 16 and the innermost position P1 can also be extracted from this embodiment. For example, in FIG. 4, an end surface 16c (an example of a first end surface) on the −D1 side (an example of a third side) of the base electrode 16 (an example of a first base electrode) on the +D3 side (an example of a first side) is inclined with respect to the D3 direction (an example of the stacking direction) such that the end surface 16c approaches the +D1 side (an example of a fourth side) while approaching the +D3 side. Such a feature may be extracted.

When the end surface 16c of the base electrode 16 is inclined as described above, for example, the likelihood of the protrusion 5z being formed is reduced, as will be described in detail later. In other words, effects are realized that are the same as or similar to the effects due to the positional relationship between the edge of the base electrode 16 and the innermost position P1 described above. In addition, the likelihood of the protrusion 5z being formed is further reduced by using a combination of the above positional relationship and the inclination of the end surface 16c.

When the feature relating to the inclination of the end surface 16c is extracted as described above, the positional relationship between the base electrode 16 and the innermost position P1 described above may or may not hold true. In addition, at least some (two or more) of the multiple exposed edges 9c may be at different positions from each other in the D1 direction, or may be at the same position.

An overview of embodiments has been described above. Specifically, embodiments will be roughly described in the following order.

Figure 5:
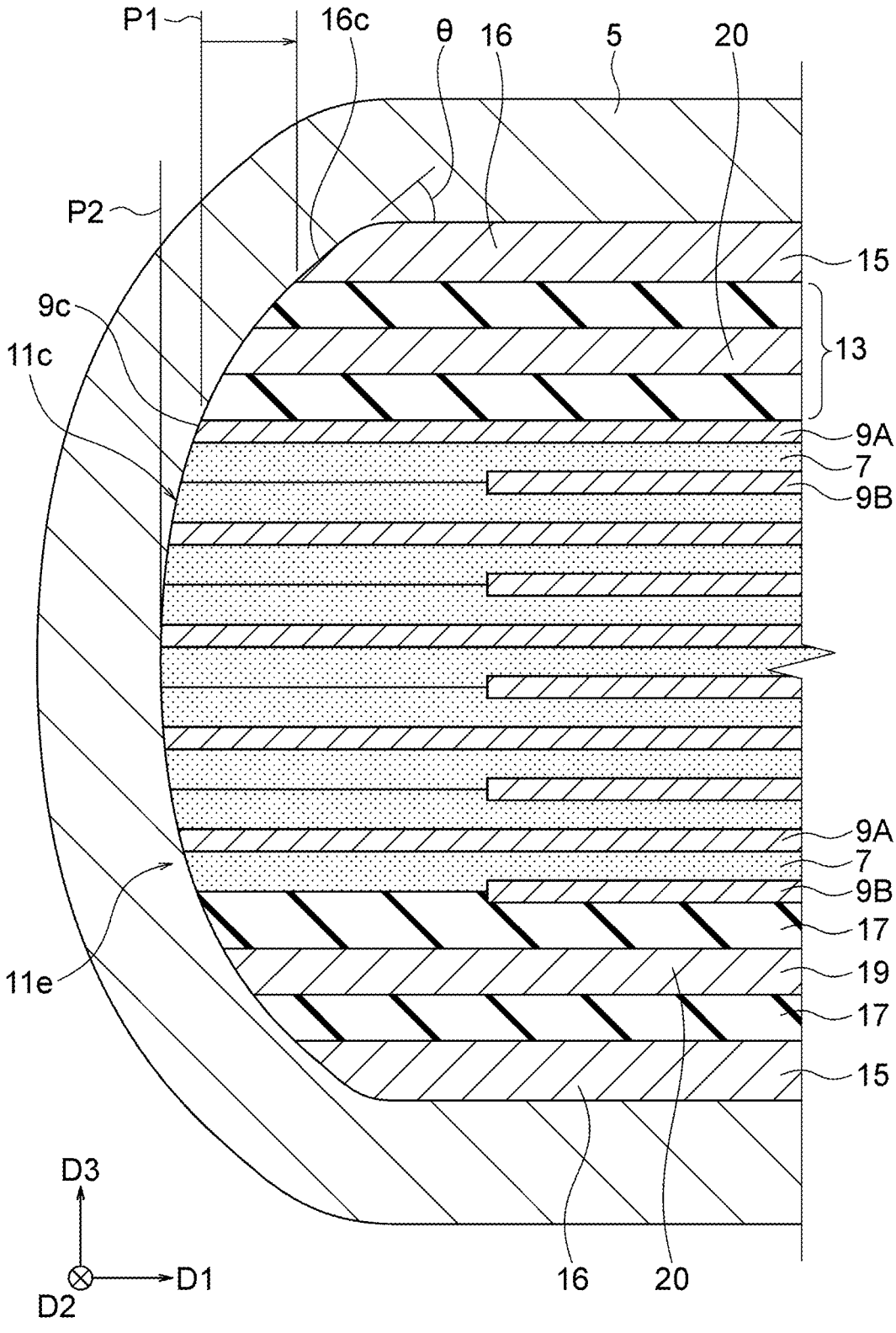
FIG. 5 is a cross-sectional view illustrating another example of a side surface of the capacitor.

1. Configuration of Capacitor According to First Embodiment (FIGS. 1 to 3)
2. Overall configuration
3. Effective part
4. Covers
5. Base electrodes
   i. Overview
   ii. Thickness
   iii. Materials
6. External electrodes Configuration Related to End Portions of Base Electrodes 1. Positions of edges of base electrodes 2. Examples of shape of side surface of body (FIGS. 4 and 5)

3. Inclination of end surfaces of base electrodes

Method of Manufacturing Capacitor

Figure 6:
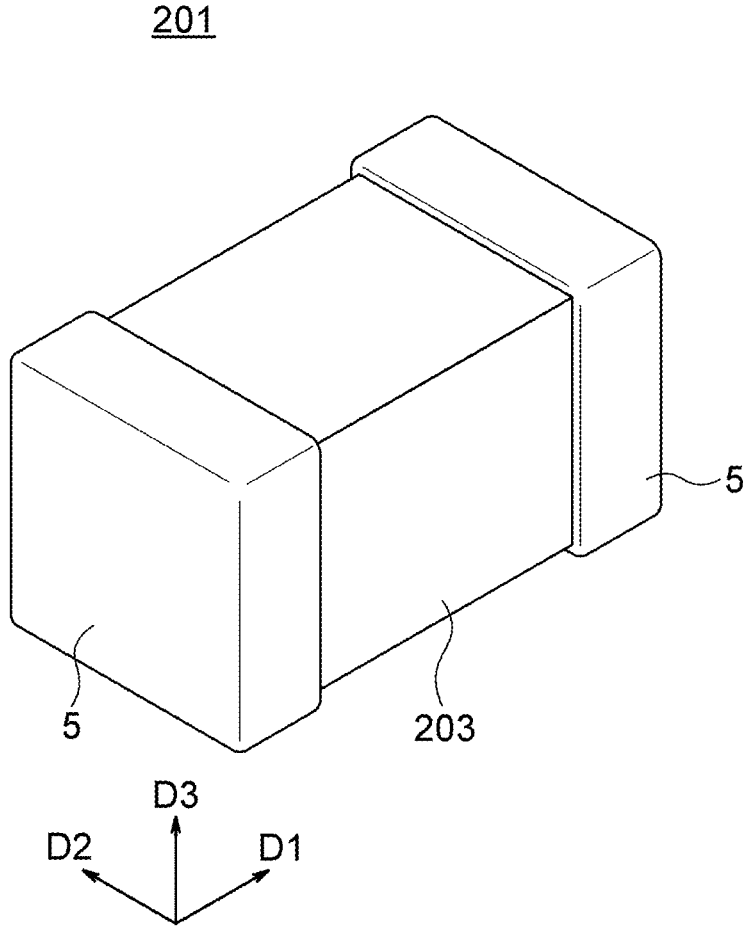
FIG. 6 is a perspective view illustrating a capacitor according to a Second Embodiment.

Configuration of Capacitor According to Another Embodiment (FIG. 6)

SUMMARY OF EMBODIMENTS

Configuration of Capacitor According to First Embodiment

1. Overall Configuration

The capacitor 1 illustrated in FIG. 1, for example, is configured as a surface mounted chip component. For example, the capacitor 1 is disposed so that the surface of the capacitor 1 on the −D3 side or +D3 side faces a circuit board, which is not illustrated. The capacitor 1 is mounted on the circuit board by bonding four pads on the circuit board to the four external electrodes 5 using a conductive bonding material (for example, solder), which is not illustrated.

The configuration (internal structure and external appearance) of the capacitor 1 is, for example, roughly symmetrical about a plane (not illustrated) parallel to the D1D2 plane and passing through the center of the capacitor 1 in the thickness direction (D3 direction). The configuration of the capacitor 1 also has 180° rotational symmetry when viewed in the D3 direction, for example. Of course, the capacitor 1 does not need to have such symmetry.

The body 3 has, for example, roughly a thin rectangular parallelepiped shape. This rectangular parallelepiped may be square (illustrated example) or oblong (excluding square; the same applies hereafter) in plan view. For convenience, in the description of the embodiment, a square shape may be assumed unless otherwise specified.

The specific dimensions of the body 3 (or capacitor 1) may be any dimensions. As an example of the dimensions when the capacitor 1 is relatively small, the length of body 3 (or capacitor 1) in the D1 and D2 directions may be 0.030 mm or more and 0.200 mm or less. When the length in the D1 direction is L and the length in the D2 direction is W, L/W may be 0.5 or more and 2.0 or less. The thickness in the D3 direction may be 0.030 mm or more and 0.200 mm or less. When the surfaces of the body 3 are not flat, for example, the maximum values of the various dimensions may satisfy the above ranges (the same applies hereinafter to the various dimensions of other components so long as no contradictions, etc., arise).

The examples of the dimensions of each component described below are also for a case where the capacitor 1 is relatively small, unless otherwise specified. Therefore, dimensions that are larger (or smaller) than those described may be adopted.

Multiple components of the same type (e.g., 5, 7, 9, 13, 15, 16, 17, 19, or 20, etc.) may basically be provided with the same (or corresponding) shape, size, material, position, etc. as each other (e.g., except for relatively small differences; the same applies hereinafter), unless otherwise specified or unless contradictions arise. Therefore, unless otherwise specified, and unless contradictions, etc. arise, a description of one component may be taken to commonly apply to multiple components of the same type.

Components consisting of one layer (film) (e.g., 5, 7, 9, 15, 17 or 19, etc.) may be composed entirely of one type of material. However, such components may also consist of layers of different materials stacked on top of each other.

1. Effective Part

The effective part 11 illustrated in FIG. 3 has, for example, a roughly thin rectangular parallelepiped shape. The planar shape thereof may be basically the same as that of the body 3. The specific thickness of the effective part 11 may be any thickness. For example, the thickness of the effective part 11 may be 30% or more, 40% or more, or 50% or more of the thickness of the body 3, and may be 90% or less, 80% or less, or 70% or less of the thickness of the body 3. These lower and upper limits may be used in any combination with each other. The thickness of the body 3 is, for example, the thickness from the top surface of the base electrodes 16 on the top surface side to the bottom surface of the base electrodes 16 on the bottom surface side. The thickness of the effective part 11 is, for example, from the top surface of the internal electrode 9 of the uppermost layer to the bottom surface of the internal electrode 9 of the lowermost layer.

Each dielectric layer 7 is basically shaped like a layer having a constant thickness (at least between the internal electrodes 9). The thickness of the dielectric layers 7 may be set as appropriate in accordance with the characteristics required for the capacitor 1. As an example of a relatively small thickness, the thickness between adjacent internal electrodes 9 (between a first internal electrode 9A and a second internal electrode 9B) may be 0.1 μm or more or 0.5 μm or more, and may be 3.0 μm or less, 2.0 μm or less, or 1.0 μm or less. These lower and upper limits may be used in any combination with each other. The shape and dimensions of the dielectric layers 7 in plan view are basically the same as the shape and dimensions of the effective part 11 in plan view. The material of the dielectric layers is, for example, a ceramic, and the specific type is any type of ceramic. The number of stacked dielectric layers 7 (internal electrodes 9) may be any number. As an example, there may be 10 or more and 30 or less layers.

The internal electrodes 9 are shaped like layers having a constant thickness. The internal electrodes 9 may have any thickness, and may have, for example, a thickness smaller than, approximately the same as, or greater than the thickness of the dielectric layers 7 in regions between the internal electrodes 9. As an example of a relatively thin thickness, the thickness of the internal electrodes 9 may be 0.3 μm or more or 0.5 μm or more, and 3.0 μm or less, 2.0 μm or less, or 1.0 μm or less. These lower and upper limits may be used in any combination with each other. The material of the internal electrodes 9 is, for example, a metal. The specific type of metal may be any type of metal, and is, for example, entirely or mainly composed of (e.g., 60% or more by mass; the same applies hereinafter) a base metal (e.g. Ni and/or Cu).

Figure 2:
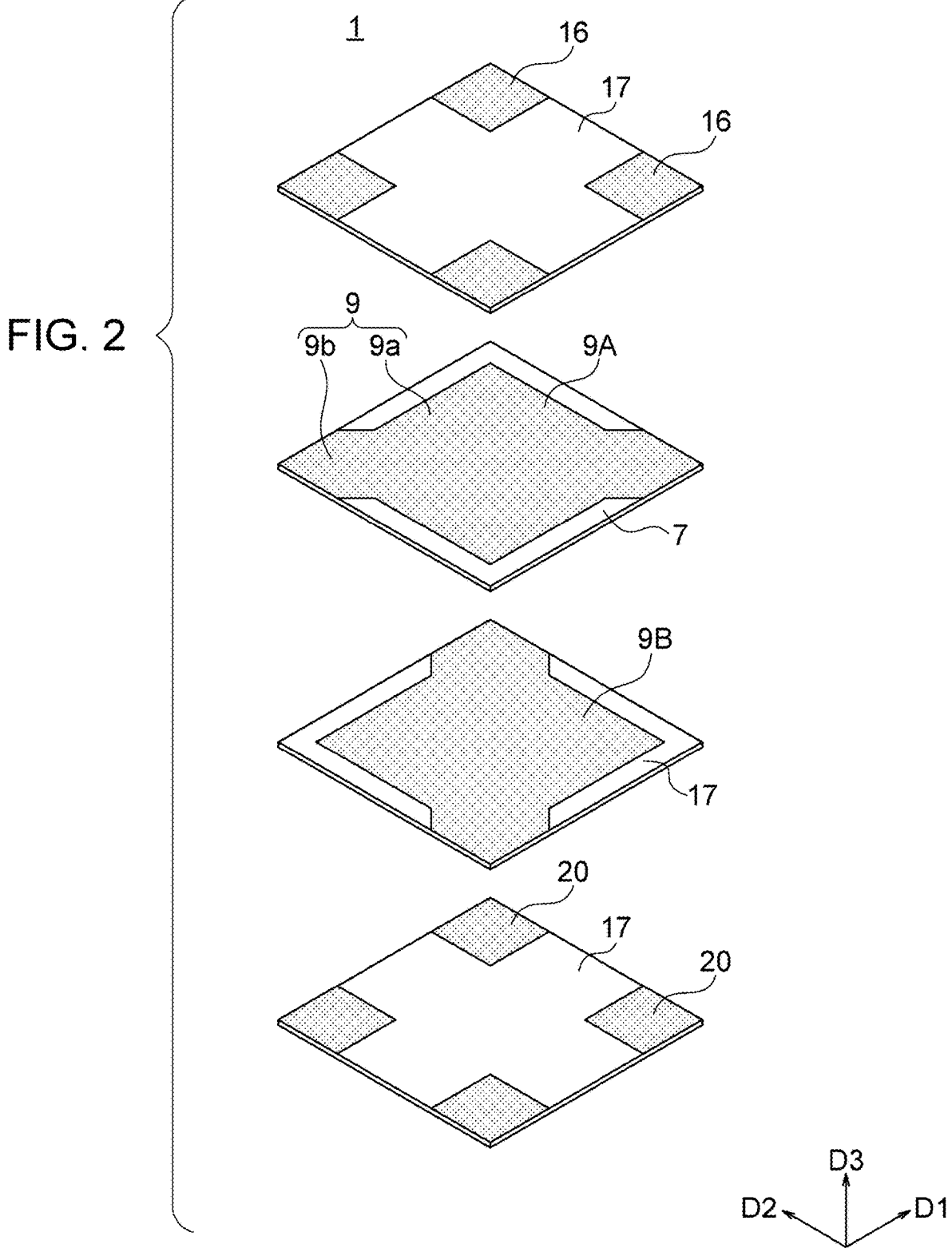
FIG. 2 is a schematic exploded perspective view of the capacitor in FIG. 1.

FIG. 2 is an exploded perspective view of the capacitor 1. FIG. 2 is a schematic diagram for explaining the shapes and relative positions of the internal electrodes 9 etc. Therefore, the various layers are depicted as being smaller in number in FIG. 2 than in FIG. 3.

The internal electrodes 9, for example, each include a rectangular (square in the illustrated example) electrode body 9a in plan view and a pair of lead-out electrodes 9b extending out from a pair of mutually opposing corners of the electrode body 9a. The electrode body 9a is positioned inward from the outer edge of the dielectric layer 7 and is not exposed from the side surfaces of the effective part 11. The pair of lead-out electrodes 9b extend to the outer edge of the dielectric layer 7 and are connected to the pair of external electrodes 5 located at the pair of mutually opposing corners of the body 3.

The first internal electrode 9A and the second internal electrode 9B face each other with the dielectric layer 7 interposed therebetween. The pair of lead-out electrodes 9b of each first internal electrode 9A and the pair of lead-out electrodes 9b of each second internal electrode 9B are positioned on different diagonal lines from each other in planar perspective view. The pairs of lead-out electrodes 9b are connected different pairs of external electrodes 5 from each other.

The various dimensions of the electrode body 9a and the lead-out electrodes 9b may be any dimensions. For example, the length of each lead-out electrode 9b on one side of the dielectric layer 7 (in other words, the length of the exposed edge 9c) is approximately the same as the length of the external electrode 5 along the one side of the dielectric layer 7.

1. Covers

Each cover 13 illustrated in FIG. 3 is shaped like a layer having a shape and dimensions so as to perfectly overlap the effective part 11. The thickness of the covers 13 is substantially constant in both regions where the base electrodes 16 are disposed and regions where the base electrodes 16 are not disposed. The ratio of the thickness of the covers 13 to the thickness of the body 3 may be roughly the reverse of the ratio of the thickness of the effective part 11 to the thickness of the body 3 (see above). For example, in a case where covers 13 are provided on both sides in the D3 direction, the thickness of one cover 13 may be, for example, 5% or more, 108, or more, or 15% or more of the thickness of the body 3, and may be 35% or less, 30% or less, or 25% or less of the thickness of the body 3. These lower and upper limits may be used in any combination with each other. The thickness of each cover 13 is, for example, the thickness in a region overlapping the internal electrodes 9 and not overlapping the base electrodes 16 (not squashed by the base electrodes 16).

Each cover 13 includes, for example, multiple (two in the example in FIG. 3) insulating layers 17 and at least one (one in the example of FIG. 3) dummy layer 19 located between the insulating layers 17. Each dummy layer 19 includes four dummy electrodes 20 at positions corresponding to the positions of the four external electrodes 5, for example. The dummy electrodes 20, for example, contribute to reinforcing the cover 13 and/or improving the connection strength between the body 3 and the external electrodes 5, and also serve as bases for the external electrodes 5 when the external electrodes 5 are formed using a plating method. Unlike in the illustrated example, each cover 13 may include only one or more insulating layers 17 (the dummy layer 19 does not need to be included).

The insulating layers 17 and the dummy layers 19 are stacked one by one in an alternating manner. In other words, the dummy layers 19 are provided at the boundaries of all the insulating layers 17. Unlike in the illustrated example, the dummy layers 19 may be provided at only some of the boundaries. For example, the dummy layers 19 may not be provided at one or more boundaries relatively close to the effective part 11, and only be provided at one or more boundaries relatively far from the effective part 11. However, in such a case, two or more insulating layers 17 adhering to each other without dummy layers 19 therebetween may be regarded as a single insulating layer 17.

The insulating layers 17 are layer shaped and have a roughly constant thickness, except for changes in thickness caused by overlapping or not overlapping conductor layers (9, 15, and 19). The planar shape of the insulating layers 17 is, for example, basically the same as the planar shape of the dielectric layers 7. The material of the insulating layers 17 may be any material. For example, the material of the insulating layers 17 may be same as or different from the material of the dielectric layers 7. The material of the insulating layers 17 may be, for example, a ceramic or may be a material other than a ceramic.

The thickness of the insulating layers 17 may be any thickness. For example, the thickness of the insulating layers 17 may be greater than (illustrated example), the same as, or less than the thickness of the dielectric layers 7 (In all cases, this refers to the thickness between conductor layers, or the thickness of a region that does not overlap any conductor layers; the same applies hereinafter in this paragraph). For example, the thickness of the insulating layers 17 may be two times or more, three times or more, or five times or more the thickness of the dielectric layers 7, and may be 20 times or less, 10 times or less, or 5 times or less the thickness of the dielectric layers 7. These lower and upper limits may be used in any combination with each other. For example, the thickness of the insulating layers 17 may be 1.0 μm or more or 2.0 μm or more, and 10.0 μm or less or 5.0 μm or less. These lower and upper limits may be used in any combination with each other. Furthermore, regardless of the material or thickness, the insulating layer that overlaps the internal electrode 9 of the uppermost layer is considered to be an insulating layer 17, not a dielectric layer 7. The same applies to the insulating layer overlapping the internal electrode 9 of the lowermost layer.

The dummy electrodes 20 are basically layer shaped with a constant thickness. The material of the dummy electrodes 20 is, for example, a metal. The specific type of metal may be any metal, and, for example, is entirely or mainly composed of a base metal (e.g. Ni and/or Cu). The material of the dummy electrodes 20 may be the same as or different from the material of the internal electrodes 9. The dummy electrodes 20 may have any positions, shapes, and dimensions in plan view. In the example in FIGS. 2 and 3, the positions, shapes, and dimensions of the dummy electrodes 20 are such that the dummy electrodes 20 perfectly overlap the external electrodes 5 in planar perspective view (however, the external electrodes 5 are slightly wider). The dummy electrodes 20 are, for example, exposed at the side surfaces of the body 3. The exposed parts are adhered to the external electrodes 5.

The dummy electrodes 20 may have any thickness. For example, the thickness of the dummy electrodes 20 may be greater than (illustrated example), the same as, or less than the thickness of the internal electrodes 9. For example, the thickness of the dummy electrodes 20 may be equal to or more, 1.5 times or more, or 2 times or more the thickness of the internal electrodes 9, and may be 10 times or less, 5 times or less, or 2 times or less the thickness of the internal electrodes 9. These lower and upper limits may be used in any combination with each other. For example, the thickness of the dummy electrodes 20 may be 0.3 μm or more, 0.5 μm or more, 1.0 μm or more, or 2.0 μm or more, and may be 10.0 μm or less, 5.0 μm or less, 3.0 μm or less, or 2.0 μm or less. These lower and upper limits may be used in any combination with each other. In addition, the thickness of the dummy electrodes 20 may be smaller than (illustrated example), the same as, or greater than the thickness of the insulating layers 17.

1. Base Electrodes i. Overview

The base electrodes 16 are basically layer shaped with a constant thickness. The material of the base electrodes 16 is, for example, a metal. The specific type of metal may be any metal, and, for example, is entirely or mainly composed of a base metal (e.g. Ni and/or Cu). The material of the base electrodes 16 may be the same as or different from the material of the internal electrodes 9 and/or the material of the dummy electrodes 20. The base electrodes 16 may have any positions, shapes, and dimensions in plan view. In the example in FIGS. 2 and 3, the positions, shapes, and dimensions of the base electrodes 16 are such that the base electrodes 16 perfectly overlap the external electrodes 5 in planar perspective view (however, the external electrodes 5 are slightly wider).

i. Thickness

The base electrodes 16 may have any thickness. For example, the thickness of the base electrodes 16 may be greater than (illustrated example), the same as, or less than the thickness of the internal electrodes 9 and/or the thickness of the dummy electrodes 20. For example, the thickness of the base electrodes 16 may be 2 times or more, 3 times or more, or 5 times or more the thickness of the internal electrodes 9 and/or the thickness of the dummy electrodes 20, and may be 20 times or less, 10 times or less, or 5 times or less the thickness of the internal electrodes 9 and/or the thickness of the dummy electrodes 20. These lower and upper limits may be used in any combination with each other. For example, the thickness of the base electrodes 16 may be 2.0 μm or more, 3.0 μm or more, or 5.0 μm or more, and may be 20.0 μm or less, 10.0 μm or less, or 5.0 μm or less. These lower and upper limits may be used in any combination with each other. In addition, the thickness of the base electrodes 16 may be smaller than, the same as, or greater than (illustrated example) the thickness of the insulating layers 17.

The thickness from the −D3-side surface (bottom surface) of the base electrode 16 on the +D3 side to the +D3-side surface (top surface) of the base electrode 16 on the −D3 side will be referred to as a first thickness. In the illustrated example, the first thickness is the total thickness of the effective part 11 and the covers 13 on both sides. For example, the thickness of the base electrodes 16 may be 0.03 times or more, 0.06 times or more, or 0.09 times or more the first thickness, and may be 0.20 times or less, 0.17 times or less, or 0.14 times or less the first thickness. These lower and upper limits may be used in any combination with each other.

i. Materials

The material of the base electrodes 16 may be a metal as described above, but may also contain a ceramic material in addition to the metal. The fact that the base electrodes 16 contain a ceramic material reduces the likelihood that the base electrodes 16 will be excessively abraded by barrel polishing (described later). On the other hand, since the base electrodes 16 are not primarily intended for conduction, there is a low probability that a high electrical resistivity due to the ceramic material will cause an inconvenience. The base electrodes 16 as well as other conductive components (e.g., internal electrodes 9 and/or dummy electrodes 20) may contain a ceramic material in addition to a metal.

In a case where the material of the insulating layers 17 of the covers 13 is a ceramic material, the ceramic material of the insulating layers 17 can diffuse into the base electrodes 16 even if the material of the base electrodes 16 is not intended to contain the ceramic material. "The base electrodes 16 contain a ceramic material" does not refer to ceramic material contained as a result of such diffusion. When the manufacturing process is known, whether or not the base electrodes 16 contain ceramic material without diffusion will be clear. In the finished product, for example, whether or not the base electrodes 16 contain a ceramic material may be determined based on whether or not the base electrodes 16 contain a ceramic material at a significant volume percentage or mass percentage (see lower limits below, for example) at a position sufficiently away from the covers 13.

The specific type of ceramic material contained in the base electrodes 16 may be any type of ceramic material. For example, when the dielectric layers 7 of the effective part 11 and/or the insulating layers 17 of the covers 13 are composed of ceramic materials, the ceramic material contained in the base electrodes 16 may be the same as or different from the ceramic material (the entirety or a main component thereof) of either or both of the dielectric layers 7 of the effective part 11 and/or the insulating layers 17 of the covers 13. Examples of the ceramic material (the entirety or a main component thereof) include barium titanate ($BaTiO_3$), titanium dioxide ($TiO_2$), strontium titanate ($SrTiO_3$), calcium titanate ($CaTiO_3$) and calcium zirconate ($CaZrO_3$).

The ceramic material in the base electrode 16 may have any volume percentage and/or mass percentage (hereinafter may be referred to as "content percentage"). The content percentage of ceramic material in the base electrodes 16 may be larger than the content percentage of ceramic material in the internal electrodes 9 and/or the dummy electrodes 20, for example. In this case, the content percentage of the latter may be zero, and the former ceramic material and the latter ceramic material may be entirely or mainly of the same type, or may be different types. Unlike in the above case, the content percentage of the former may be equal to or less than the content percentage of the latter.

Examples of the content percentage of the ceramic material in the base electrodes 16 are given below. For example, the volume percentage may be 10 vol % or more, 20 vol % or more, or 30 vol % or more, and may be 80 vol % or less, 70 vol % or less, or 60 vol % or less. These lower and upper limits may be used in any combination with each other. The mass percentage may be 3 mass % or more, 5 mass % or more, 10 mass % or more, or 20 mass % or more, and may be 40 mass % or less, 30 mass % or less, or 20 mass % or less. These lower and upper limits may be used in any combination with each other.

Just to be clear, the volume percentage of ceramic material is the ratio of the volume of ceramic material to the unit volume of the electrode being considered (for example, the base electrode 16). Similarly, the mass percentage of ceramic material is the ratio of the mass of ceramic material to the unit mass of the electrode being considered (for example, the base electrode 16). The volume percentage and mass percentage may be identified by weighing the electrode materials when fabricating the electrodes, or by analyzing the completed capacitor 1. In the latter case, for example, the volume percentage may be identified based on cross-sectional images acquired by an SEM (scanning electron microscope) at an appropriate magnification. The mass percentage may be identified based on analysis involving quantitative analysis using XRF (X-ray Fluorescence) or WDX (wavelength dispersive X-ray spectroscopy), for example.

As already mentioned, at the boundaries between the electrodes (e.g., base electrodes 16) and the ceramic layers (e.g., insulating layers 17), which are in contact with each other, the ceramic material in the latter may diffuse into the material of the former. In this situation, if the content percentage is identified from the completed product, for example, the content percentage in a region where no diffusion has occurred may be identified as the content percentage in that electrode. In a case where diffusion affects the content percentage even at positions far from the interfaces, the content percentage in a central thickness range when the thickness of the electrode is divided into three equal parts may be identified as the content percentage in that electrode. The ceramic material may be unevenly distributed within the electrode, independent of the effects of diffusion described above. When identifying the content percentage from the completed product, the content percentage may be identified in a large region and/or in multiple regions such that the effect of such uneven distribution is negligible, and the average value of such regions may be identified as the content percentage in the electrode.

1. External Electrodes

The external electrodes 5 are basically layer shaped with a constant thickness. The material of the external electrodes 5 is, for example, a metal. The specific type of metal may be any metal, and, for example, is entirely or mainly composed of a base metal (e.g. Ni and/or Cu). The external electrodes 5 may be configured by stacking different materials as needed. For example, the external electrodes 5 may consist of layers of Cu, Ni, and Sn from the side of the base electrodes 16. The material of the external electrodes 5 may be the same as or different from the material of the internal electrodes 9, the dummy electrodes 20 and/or the base electrodes 16.

As illustrated in FIG. 1, each external electrode 5 covers four surfaces (top surface, bottom surface, and two side surfaces) of the body 3, for example, substantially at the corners of the body 3 in plan view. This allows connection of one external electrode 5 to one lead-out electrode 9b on two side surfaces of the body 3, and also enables surface mounting using either the top surface or the bottom surface of the capacitor 1. The parts of the external electrode 5 on each surface may have any shapes and dimensions. The planar shape of the part of each external electrode 5 located on the top surface or bottom surface of the body 3 is, for example, rectangular (square in the illustrated example). The planar shape and dimensions of the parts of the external electrode 5 located on the side surfaces of the body 3 are, for example, rectangular in shape with the same lateral length as the part located on the top surface or bottom surface.

The external electrodes 5 may have any thickness. For example, the thickness of the external electrodes 5 may be greater than the thickness of the internal electrodes 9, the dummy electrodes 20, and the base electrodes 16. For example, the thickness of the external electrodes 5 may be 1.2 times or more, 2 times or more, or 3 times or more the thickness of the base electrodes 16, and may be 10 times or less, 5 times or less, or 3 times or less the thickness of the base electrodes 16. These lower and upper limits may be used in any combination with each other. For example, the thickness of the external electrodes 5 may be 3 $\mu$m or more, 5 $\mu$m or more, or 10 $\mu$m or more, and may be 30 $\mu$m or less, 20 $\mu$m or less, or 10 $\mu$m or less. These lower and upper limits may be used in any combination with each other.

End Portions of Base Electrodes

1. Positions of Edges of Base Electrodes

As described with reference to FIG. 4, the –D1-side edge of the base electrode 16 is located at the innermost position P1 or farther toward +D1 side than the innermost position P1 in the D1 direction (hereinafter may be referred to as "condition A" for convenience). In the example in FIG. 4, the end surface 16c of the base electrodes 16 is inclined. In other words, the position of the –D1-side edge of the base electrode 16 is different at the top surface and the bottom surface of the base electrode 16. Thus, in a case where the position of the –D1 edge of the base electrode 16 differs depending on the position in the D3 direction, the position farthermost toward the –D1 side may be referenced as the position of the –D1-side edge of the base electrode 16. The position of the edge in the center of the end surface 16c in the D3 direction may be located farthermost toward the –D1 side (see FIG. 7 mentioned below). If the position of the –D1-side edge of the internal electrodes 9 differs between the top surface and bottom surface (the position of the –D1-side edge of the internal electrodes 9 differs depending on the position in the D3 direction), the position farthermost toward +D1 side may be referenced, contrary to the above description. In other words, the satisfaction of condition A may be strictly judged.

Let us focus on one base electrode 16. The base electrode 16 and each internal electrode 9 (exposed edge 9c) have a length in the D2 direction. Therefore, there are countless cross sections as illustrated in FIG. 4. Condition A does not need to be satisfied in all the cross sections. For example, condition A may be satisfied across $\frac{1}{3}$ or more, $\frac{1}{2}$ or more, or $\frac{2}{3}$ or more of the length of the base electrode 16 in the D2 direction. Of course, condition A may be satisfied along the entire length of the base electrode 16 in the D2 direction.

Whether or not condition A is satisfied in a length range as described above may be determined, for example, based on a predetermined number (e.g., 3, 5, or 10) of D1D3 cross-sectional images set at equal distances relative to the length of the base electrode 16 in the D2 direction. If extracting multiple cross-sectional images from a single capacitor 1 is difficult, multiple cross-sectional images may be extracted from multiple capacitors 1 of the same type. Cross-sectional images may be acquired using SEM, for example, at an appropriate magnification.

In the examples in FIGS. 1 to 3, the base electrodes 16 are located at the four corners of the top and bottom surfaces of the body 3, respectively, for a total of eight base electrodes 16. Condition A does not need to be satisfied by all the multiple (8) base electrodes 16. Each of the base electrodes 16 can satisfy condition A in each of the D1 and D2 directions, but condition A does not need to be satisfied in both directions. Therefore, for example, condition A may be satisfied with respect to only one direction at only one base electrode 16. Of course, condition A may be satisfied at all base electrodes 16 and in all directions (limited to those where condition A can be satisfied).

We mentioned that condition A does not need to be satisfied in all cross sections, etc. This description may be applied to the dimensions, etc., described below. The same applies to conditions B and C described below and the dimensions, etc. described in connection with these conditions. For example, in the above description, words in condition A may be replaced by words in condition B or C, so long as no contradictions etc. arise.

When the innermost position P1 (FIG. 4) is said to be the same as the position of the –D1-side edge of the base electrode 16 in the D1 direction, for example, a difference of less than 0.5 $\mu$m may exist. When the position of the –D1-side edge of the base electrode 16 in the D1 direction is located farther toward the +D1 side than the innermost position P1, the distance between the two positions (in the D1 direction) may be any distance. For example, the distance may be 0.5 $\mu$m or more, 1 $\mu$m or more, or 3 $\mu$m or more, and may be 10 $\mu$m or less or 5 $\mu$m or less. These lower and upper limits may be used in any combination with each other. For example, the distance may be 0.01 times or more, 0.05 times or more, or 0.10 times or more the thickness of the body 3, and may be 0.30 times or less, 0.20 times or less, or 0.10 times or less the thickness of the body 3. These lower and upper limits may be used in any combination with each other.

The degree of difference between the positions of the exposed edges 9c of multiple first internal electrodes 9A in the D1 direction may take any value. For example, the difference between the position of the exposed edge 9c located farthermost toward the −D1 side (sometimes referred to as an "outermost position P2") and the innermost position P1 may be 0.5 μm or more, 1 μm or more, 2 μm or more, or 3 μm or more and may be 10 μm or less or 5 μm or less. These lower and upper limits may be used in any combination with each other. The difference may be 0.05 times or more, 0.1 times or more, or 0.2 times or more, and may be 1.0 times or less or 0.5 times or less the thickness of the effective part 11. These lower and upper limits may be used in any combination with each other.

In a case where condition A is satisfied, the −D1 side (an example of a third side) edge of the base electrode 16 is positioned farther toward the +D1 side (an example of a fourth side) than the outermost position P2 (hereinafter may be referred to as a "condition B"). In contrast to the illustrated example, condition B may be satisfied without condition A being satisfied. The description related to condition A may be incorporated into condition B so long as no contradictions arise. Just to be clear, for example, the position of an edge used as a reference may be selected so that condition B is satisfied more strictly. Condition B may be satisfied in ⅓ or more of, ½ or more of, ⅔ or more of, or the entire length of the base electrode 16 in the D2 direction. Condition B may be satisfied with respect to only one direction at only one base electrode 16, or condition B may be satisfied at all base electrodes 16 and in all directions.

The distance in the D1 direction between the outermost position P2 and the −D1-side edge of the base electrode 16 when condition B is satisfied may be any distance. Specific examples of such a distance when conditions A and B are satisfied may be obtained from a combination of a specific example of the distance in the D1 direction between the innermost position P1 and the −D1-side edge of the base electrode 16 (already described), and a specific example of the degree of difference between the positions of multiple exposed edges 9c in the D1 direction (already described).

For example, regardless of whether condition A is satisfied, the distance in the D1 direction between the outermost position P2 and the −D1-side edge of the base electrode 16 may be 0.5 μm or more, 1 μm or more, 3 μm or more, or 6 μm or more, and may be 30 μm or less, 20 μm or less, 10 μm or less, or 5 μm or less. The above lower and upper limits may be used in any combination with each other so long as no inconsistencies arise. For example, the distance may be 0.01 times or more, 0.05 times or more, 0.10 times or more, or 0.30 times or more the thickness of the body 3, and may be 1.5 times or less, 1.0 times or less, 0.50 times or less, 0.30 times or less, 0.20 times or less, or 0.10 times or less the thickness of the body 3. The above lower and upper limits may be used in any combination with each other so long as no inconsistencies arise.

1. Examples of Shape of Side Surface of Body

In the example illustrated in FIG. 4, as already mentioned, the end surface 11c of the effective part 11 includes the recessed portion 11d, and as a result, the positions of the exposed edges 9c of at least some (two or more) of the multiple first internal electrodes 9A in the D1 direction are different from each other. More precisely, the side surface of the body 3 (including the end surface 11c) is shaped such that the ridges between the side surface and the top surface and the bottom surface are chamfered in the form of curved surfaces. The recessed portion 11d is located between the upper and lower chamfered surfaces (or between protruding portions from another perspective). Due to the chamfered surfaces described above, the edge of each base electrode 16 has different positions in the D1 direction at the top surface and the bottom surface (the end surface 16c connecting the two is inclined), as previously described.

The specific shape and dimensions of the recessed portion 11d and the chamfered surfaces may be any shapes and dimensions. For example, the upper and lower chamfered surfaces may be asymmetrical in shape, and the recessed portion 11d may also be asymmetrical in the vertical direction. In other words, the side surface of the body 3 may have a vertically asymmetrical shape. In the illustrated example, the side surface of the body 3 is positioned with the +D3 side region located farther toward the −D1 side than the −D3 side region. Of course, the side surface of the body 3 may be symmetrical about an axis of symmetry that passes through the center of the vertical direction of the body 3 and is parallel to the D1 direction. The entirety of the recessed portion 11d may be recessed with a curved shape in cross-sectional view (illustrated example), or part of or the majority of the recessed portion 11d may contain straight portions.

For example, the position in the D3 direction of the apex of the part of the side surface of the body 3 that bulges outward toward the −D1 side may be located at the boundary between the effective part 11 and the cover 13, may be located at the cover 13, or may be located at the effective part 11. In addition, for example, the recessed portion 11d may include a central part of the end surface 11c in the D3 direction. For example, an innermost portion of the recessed portion 11d may be located in the center of the end surface 11c in the D3 direction, or may be shifted from the center. The recessed portion 11d may, for example, extend along ½ or more or ⅔ or more of the length of the end surface 11c in the D3 direction.

FIG. 5 is a cross-sectional view illustrating another example of the shape of the end surface 11c of the effective part 11 (and the side surface of the body 3) and corresponds to FIG. 4.

In the example in FIG. 5, the end surface 11c includes a protruding portion 11e that bulges toward the −D1 side, and as a result, the exposed edges 9c of at least some (two or more) of the multiple first internal electrodes 9A have different positions from each other in the D1 direction. More precisely, the side surface of the body 3 (including the end surface 11c) is shaped such that the ridges between the side surface and the top surface and the bottom surface are chamfered in the form of curved surfaces, resulting in a protruding shape. The region between the top and bottom chamfered surfaces also has a protruding shape bulging toward the −D1 side. The end surface 11c includes the protruding portion 11e formed as a result of regions on both the upper and lower sides being located on the chamfered surfaces and/or as a result of the central region being located on a protruding surface located between the chamfered surfaces.

Unlike in the illustrated example, the region between the upper and lower chamfered surfaces may be flat. The end surface 11c may include the protruding portion 11e formed as a result of regions on both the upper and lower sides being positioned on the chamfered surfaces (from another perspective, the top of the protruding portion 11e may be flat). A chamfered surface may be positioned above or below the end surface 11c, and the protruding portion 11e may be constituted by only the protruding surface between the chamfered surfaces. The upper and lower chamfered surfaces and the protruding surface therebetween may be distinguishable or indistinguishable from each other by differences in radii of curvature, etc. In the former case, the radius of curvature of the protruding surface between the upper and lower chamfered surfaces may be larger (illustrated example) or smaller than the radius of curvature of the chamfered surfaces. In the latter case, recessed portions may be formed between the chamfered surfaces and the protruding surface.

The specific shape and dimensions, etc., of the protruding portion 11e (chamfered surfaces and/or the surface therebetween) may be any shapes and dimensions. For example, the side surface of the body 3 may have a vertically symmetrical (illustrated example) or asymmetrical shape. In addition, for example, the protruding portion 11e may include a central part of the end surface 11c in the D3 direction. For example, the apex of the protruding portion 11e may be located in the center of the end surface 11c in the D3 direction, or may be shifted from the center. The protruding portion 11e may, for example, extend along ½ or more or ⅔ or more of the length of the end surface 11c in the D3 direction.

Regarding the specific dimensions of the depth of the recessed portion 11d and the height of the protruding portion 11e, for example, the description of the specific examples of the degree of difference between the positions of the exposed edges 9c of the internal electrodes 9 in the D1 direction described previously may be applied.

1. Inclination of End Surfaces of Base Electrode

As already mentioned, in FIG. 4 or 5, the −D1-side end surface 16c of the base electrode 16 on the +D3 side is inclined with respect to the D3 direction in a direction such that the end surface 16c approaches the +D1 side while approaching the +D3 side (hereinafter may be referred to as "condition C"). When stating this, strictly speaking, the entire end surface 16c (from the ridge line with the top surface to the ridge line with the bottom surface) does not need to be inclined with respect to the D3 direction. For example, the −D1-side edge (corner) of the bottom surface of the base electrode 16 on the +D3 side may be rounded, and as a result the inclination in the above-mentioned direction may not occur in the vicinity of that edge. For example, if the inclined surface extends across 60% or more (more than half) or 80% or more (the majority) of the thickness (the thickness of a part with a constant thickness) of the base electrode 16, condition C may be regarded as being satisfied. Of course, the entirety of the end surface 16c may be included (excluding any rounding etc. that is unavoidable in the manufacturing process when viewed microscopically).

In the examples in FIGS. 4 and 5, at least part of the end surface of the cover 13 on the side near the base electrode 16 (the entire end surface in the illustrated example) is inclined. For example, the surface (bottom surface or top surface) of the base electrode 16 on the side near the cover 13 does not overlap the inclined end surface of such a cover 13, but only overlaps the surface (top surface or bottom surface) of the cover 13 on the side near the base electrode 16. The base electrode 16 tapers towards the end, resulting in the end surface 16c being inclined. In other words, the inclined surface of the end surface 16c is not formed by an end portion of the base electrode 16 having a constant thickness overlapping an inclined end surface of the cover 13 and being inclined.

In more detail, for example, the position, in the D1 direction, of the edge of the surface of the base electrode 16 on the side near the cover 13 is the same as the position, in the D1 direction, of the edge of the surface of the cover 13 on the side near the base electrode 16 (illustrated example), or is located inward (on the +D1 side in FIGS. 4 and 5) with respect to the latter position. Note that, relatively small differences may be permitted within the meaning of "the same". The differences may be, for example, ⅕ or less, 1/10 or less, or 1/20 or less of the length of the end surface 16c in the D1 direction, and/or may be 5 μm or less, 2 μm or less, or 1 μm or less.

From another perspective, the inclined surface of the end surface of the cover 13 is smoothly connected to the end surface 16c (inclined surface) of the base electrode 16. In other words, both surfaces together constitute a chamfered surface of the body 3 (already mentioned). In the respective examples of the +D3 side in FIG. 4, and the −D3 side and the +D3 side in FIG. 5, the inclined surfaces are continuous surfaces extending over the entire thicknesses of the base electrodes 16 and the entire thicknesses of the covers 13, without a discontinuity, step, or the like. Unlike in the illustrated example, for example, only the end surface 16c of the base electrode 16 may constitute the chamfered surface of the body 3.

The specific shape and dimensions, etc. of the end surface 16c of the base electrode 16 may be any shape and dimensions etc., as is clear from the previous description of the chamfered surface of the ridge between the side surface and the top surface (or bottom surface) in the body 3. For example, in cross-sectional view as illustrated in FIGS. 4 and 5, the entirety of the end surface 16c may be straight, protruding, or recessed. The end surface 16c may contain only one or more straight portions, one or more curved portions, or both. The end surface 16c may include multiple protruding portions (corners) and/or multiple recessed portions.

In a cross-sectional view such as FIGS. 4 and 5, θ represents the angle of inclination of the end surface 16c with respect to the D1 direction (top and bottom surfaces from another perspective). The magnitude of the inclination angle θ may take any value. For example, the inclination angle θ may be greater than 3°, 5° or 10°, and may be less than 800, 45°, 30° or 20°. These upper and lower limits may be used in any combination with each other.

As already mentioned, the end surface 16c is not limited to being shaped like a straight line in a cross-sectional view such as FIGS. 4 and 5. That is, the angle of inclination (e.g., tangential inclination) can vary depending on the position within the end surface 16c. Thus, the inclination angle θ (angle when simply referring the inclination angle of the end surface 16c) here may be specified as follows.

The description here will focus on the base electrode 16 on the +D3 side in FIGS. 4 and 5. The intersection between the end surface 16c and the −D3-side surface of the base electrode 16 is a first position. In the base electrode 16, the thickness of a portion with a constant thickness (i.e., a portion spaced away from the end surface 16c) is a reference thickness. Within the end surface 16c, the position at which the height from the −D3 side surface of the base electrode 16c is 80% of the reference thickness is a second position. Assume that a straight line connects the first and second positions. The angle between this straight line and the D1 direction (top surface and bottom surface of the base electrode 16) is the inclination angle θ.

The reason why the intersection between the end surface 16c and the +D3 side surface of the base electrode 16 was not made the second position is as follows. The end surface 16c may extend in a curved shape so as to approach being parallel with the D1 direction as the end surface 16c comes closer to the +D3 side and be smoothly connected to the +D3 side surface of the base electrode 16. In this case, identifying the above intersection may be difficult, or the inclination angle θ may be too small relative to the inclination angle of the majority of the end surface 16c when the above intersection is the second position. By setting the second position at 80% of the height of the reference thickness, such an inconvenience can be avoided. If there are any variations in the thickness of the base electrode 16 due to the surface roughness of the base electrode 16, etc., the average thickness may be used as the reference thickness.

Method of Manufacturing Capacitor

Various manufacturing methods may be used to manufacture the capacitor 1. For example, the general procedure may be the same as or similar to a known procedure. An example will be described below.

First, ceramic green sheets, which will form the dielectric layers 7 and the insulating layers 17, are fabricated. Next, conductive paste is applied to (for example, printed on) the ceramic green sheets to form the internal electrodes 9, dummy electrodes 20, or base electrodes 16. Next, the ceramic green sheets are stacked to fabricate a multilayer body that will become the body 3. The stacking of the multilayer body, which will become the effective part 11, and the stacking of the parts that will become the covers 13 for the multilayer body may be carried out together or separately.

Up to the fabrication of the multilayer body, the steps are carried out, for example, at the size of a mother substrate from which a large number of bodies 3 will be obtained. After fabrication of the multilayer body, the mother substrate containing the multilayer bodies is divided (e.g., cut) into pieces of a size that generally corresponds to the size of the body 3. Next, the multilayer body having the size of the body 3 is fired. After that, the external electrodes 5 are formed by depositing metal films on the body 3.

Degreasing may be performed prior to firing. Firing may be performed, for example, in a reducing atmosphere. Re-oxidation heat treatment may be performed after firing. The body 3 may be polished (e.g., barrel polished) before and/or after firing. In the polishing, for example, the ridges of the body 3 may be chamfered and the side surfaces of the body 3 may be polished.

Any method may be used to make the end surface 11c of the effective part 11 non-flat (to make the exposed edge portions 9c of the multiple internal electrodes 9 be located at different positions from each other in the D1 direction). For example, the polishing (e.g., barrel polishing) may be used to chamfer the ridges of the body 3 and form inclined surfaces at both the top and the bottom of the end surface 11c. For example, by making the ratio of the thickness (or volume) of the conductive paste (internal electrodes 9) in the effective part 11 larger than that of the conductive paste (dummy electrodes 20) in the covers 13, the effective part 11 may be made to contract more in the D1 direction during firing than the covers 13 and the recessed portion 11d may be formed in the end surface 11c. For example, the recessed portion 11d or the protruding portion 11e may be formed by locally removing the side surface of the body 3 by blasting (e.g., sandblasting) or laser processing etc.

Any method may be used to position the −D1 side (outer) edges of the base electrodes 16 farther toward the +D1 side (inner side) than the innermost position P1. For example, the edges of the base electrodes 16 may be positioned inward by chamfering the ridges of the body 3 by performing the above-mentioned polishing (e.g., barrel polishing). For example, the base electrodes 16 (conductive paste) may be made relatively thicker, and during firing, the base electrodes 16 may be allowed to contract in the D1 direction more than the effective part 11 and covers 13 so that the positions of the edges of the base electrodes 16 are shifted inward. For example, the edges of the base electrodes 16 may be positioned inward in advance when the conductive paste that will become the base electrodes 16 is applied to the ceramic green sheets that will become the insulating layers 17. For example, the edges of the base electrodes 16 may be positioned inward by shaving off the edges of the base electrodes 16 before or after firing by performing blasting (e.g., sandblasting) or laser processing.

The external electrodes 5 may be formed using various methods. For example, a metal may be deposited on the surfaces of base electrodes 16 and the exposed edges 9c by performing electroless plating and/or electrolytic plating. For example, thin film forming methods such as dipping, printing, CVD (chemical vapor deposition) or PVD (physical vapor deposition) may be employed. As can be understood from the above description, the base electrodes 16 may or may not contribute to metal deposition.

Configuration of Capacitor According to Another Embodiment

FIG. 6 is a perspective view illustrating a capacitor 201 according to a Second Embodiment. FIGS. 3 to 5 relating to the First Embodiment may be referenced as cross-sectional views of the capacitor 201.

Generally speaking, the capacitor 201 differs from the capacitor 1, which is a four-terminal type capacitor, in that the capacitor 201 is a two-terminal type capacitor. In the capacitor 201 as well, the −D1 side edge of the base electrode 16 may be located at the innermost position P1 or farther toward +D1 side than the innermost position P1, as described with reference to FIGS. 3 to 5.

The specific shape and dimensions of each part of the capacitor 201 may differ from those of the capacitor 1 due to the fact that the capacitor 201 is a two-terminal type capacitor. This is described more specifically below.

The shape of a body 203 (or capacitor 201) is a substantially rectangular parallelepiped shape, for example. The height (length in the D3 direction) of this rectangular parallelepiped may be the same as (illustrated example) or smaller than the width (length in the D2 direction) of the rectangular parallelepiped. The length (D1 direction) of the rectangular parallelepiped is larger than the width, for example. The body 203 may have any dimensions. So long as the length in the D1 direction is larger than the length in the D2 direction, the specific example of the dimensions of the body 3 in the First Embodiment may be applied to the dimensions of the body 203. Each external electrode 5 is substantially layer shaped and covers a corresponding end portion of the body 203 in the longitudinal direction across five surfaces of the rectangular parallelepiped.

The planar shape of each internal electrode 9 is, for example, a substantially oblong shape with four sides parallel to the four sides of the oblong shape of the body 203 (dielectric layers 7). Among the four sides of the internal electrode 9, two long sides and one short side are located inward (not exposed) from the side surfaces of the body 203, for example. The remaining one short side is exposed from the +D1 or –D1 side surface of the body 203 and constitutes the exposed edge 9*c*. The region of each internal electrode 9 that overlaps the other internal electrodes 9 in planar perspective view constitutes the electrode body 9*a*. The part that extend from the electrode body 9*a* to the external electrode 5 is the lead-out electrode 9*b*.

Each dummy layer 19 includes two dummy electrodes 20 at both ends of the body 203 in the longitudinal direction. The planar shape of each dummy electrode 20 is a rectangular shape, for example, that extends across the entire width (length in the D2 direction) of the body 203, and the dummy electrode 20 is exposed from the +D1 side surface or the –D1 side surface of the body 203, as well as from the +D2 side surface and the –D2 side surface. The description of the configuration of the above-mentioned dummy layers 19 (dummy electrodes 20) in plan view may be applied to the configuration of the base layers 15 (base electrodes 16) in plan view.

Although not specifically illustrated, other examples of capacitor configurations are described below.

The capacitor may include exterior resin that covers the entirety of the configuration illustrated in FIG. 1 or FIG. 6, and lead wires that extend from the exterior resin and are connected to the external electrodes 5. From another perspective, the capacitor may be a through-hole mounting type capacitor rather than a surface mounting type capacitor. In this case, one external electrode 5 may only cover one side surface.

The two types of internal electrodes 9, which are connected to different external electrodes 5, may be stacked two at a time in an alternating manner, rather than one at a time in an alternating manner. In this case, for example, the thickness of the dielectric layers 7 between the internal electrodes 9 connected to the same external electrode 5 and facing each other may be made smaller than the thickness of the dielectric layers 7 between the internal electrodes 9 connected to different external electrodes 5 and facing each other. As is clear from this description, the multiple dielectric layers 7 do not need to have the same shape and size.

In addition, the two types of internal electrodes 9, which are connected to different external electrodes 5, do not need to face each other. For example, the two types of internal electrodes 9, which are connected to different external electrodes 5, may be provided in the same layer, and an internal electrode 9 facing the above two types of internal electrodes 9 may be provided, thereby forming a configuration in which two parallel plate capacitors are connected in series with each other. A circuit in which three or more parallel plate capacitors are connected in series with each other may also be configured.

In the example in FIG. 6, the part of the edge of each internal electrode 9 that is not the exposed edge 9*c* (referred to as a "non-exposed edge" in this paragraph) is not exposed from the side surfaces of the body 203. This non-exposed edge is covered by the parts of the dielectric layers 7 and insulating layers 17 that extend outside the non-exposed edge. However, the non-exposed edge may be covered by stacking another dielectric layer on the side surface of the multilayer body constituted by the dielectric layers 7 and insulating layers 17, thereby avoiding exposure of the non-exposed edge. From another perspective, the body 203 does not need to have a multilayer structure throughout.

SUMMARY OF EMBODIMENTS

In the following description, for convenience, the symbols of the First Embodiment are used. However, the matters described below also apply to other embodiments so long as no contradictions arise.

A multilayer electronic component (capacitor 1) includes the effective part 11, a first cover (for example, the cover 13 on the +D3 side), and a first base electrode (for example, the base electrode 16 on the +D3 side). The effective part 11 includes the dielectric layers 7 and the internal electrodes 9 stacked in an alternating manner in the stacking direction (D3 direction). The cover 13 on the +D3 side overlaps the effective part 11 from the +D3 side out of a first side (e.g., +D3 side) and a second side (e.g., –D3 side) in the D3 direction. The +D3 side base electrode 16 overlaps the +D3-side cover 13 from the +D3 side. The effective part 11 has the end surface 11*c* that faces toward the –D1 side out of a third side (e.g., –D1 side) and a fourth side (+D1 side) of a first direction (e.g., D1 direction) that intersects the D3 direction. The multiple internal electrodes 9 include two or more internal electrodes (for example, first internal electrodes 9A), each having an exposed edge 9*c* that is exposed from the end surface 11*c*. At least some (two or more) of the multiple exposed edges 9*c* are located at different positions from each other in the D1 direction. The +D3-side base electrode 16 is located on a –D1-side region (with respect to the center) of the +D3-side surface of the +D3-side cover 13 (i.e., the –D1-side edge of the base electrode 16 described below is not the edge, toward the center of the cover 13 in the D1 direction, of the base electrode 16 located in the +D1-side region.). The position of the exposed edge 9*c* located farthermost toward +D1 side among the multiple exposed edges 9*c* is referred to as the innermost position P1. In this case, the –D1-side edge of the base electrode 16 on the +D3 side is at the same position as the innermost position P1 or farther toward the +D1 side than the innermost position P1 (the previously mentioned "condition A" is satisfied).

Therefore, for example, the likelihood of the protrusion 5*z* being formed on the external electrode 5 is reduced, as described in the overview of embodiments. For example, this is described more specifically below.

Figure 7:
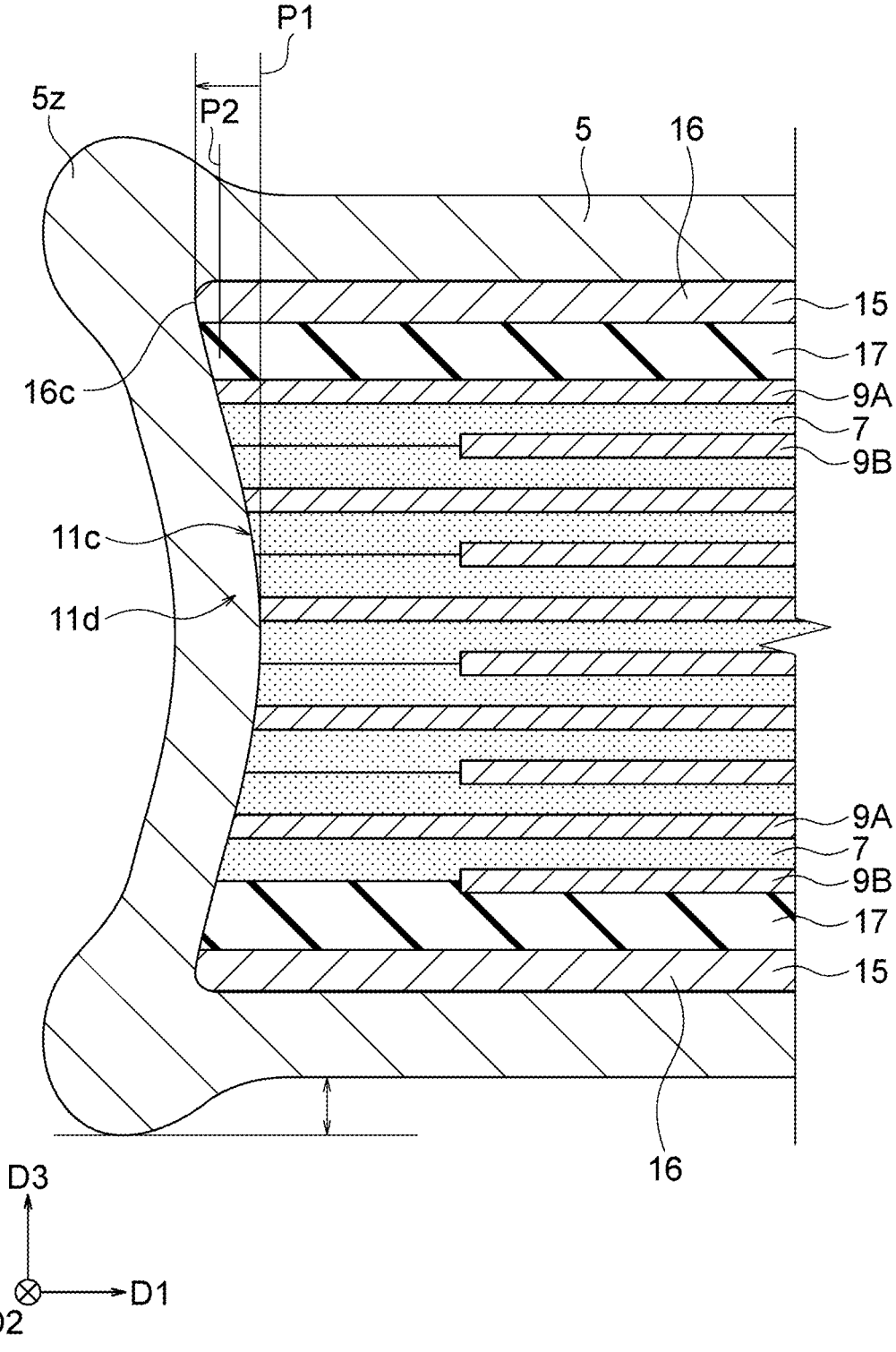
FIG. 7 is a cross-sectional view illustrating a side surface of a capacitor according to a comparative example.

FIG. 7 is a cross-sectional view illustrating a capacitor according to a comparative example and corresponds to FIG. 4 and FIG. 5. The capacitor according to the comparative example differs from the capacitor 1 according to an embodiment in that the –D1-side edge of the base electrode 16 is positioned farther toward the –D1 side than the innermost position P1. In other words, condition A is not satisfied.

In the capacitor according to the comparative example, the dummy electrodes 20 are not provided, and the covers 13 are composed only of the insulating layers 17. The covers 13 and the base electrodes 16 are relatively thinner than those in FIGS. 4 and 5. The overall thickness of the body 3 is smaller due to the thinner covers 13. Consequently, chamfering by barrel polishing is more difficult. Since the dummy electrodes 20 are not provided and the base electrodes 16 are thin, the force exerted on the insulating layers 17 by the shrinkage of the conductive paste during firing is smaller. For these reasons, condition A is unlikely to be satisfied.

If condition A is not satisfied, the –D1-side edge of the base electrode 16 is likely to constitute a sharp ridge of the body 3 As a result, the metal that will become the external electrode 5 adheres to the –D3 side as well as the +D3 side and –D1 side of the edge of the base electrode 16. Furthermore, when electroplating is used, the amount of metal deposited increases due to the electric field concentration. This situation tends to result in the external electrode 5 being thicker. As a result, the protrusion 5*z* is more likely to be formed. The protrusion 5*z*, for example, protrudes laterally (on the −D1 side in FIG. 7) and/or upward or downward relative to the rest of the external electrode 5.

If the protrusion 5z protrudes laterally, for example, there is a higher likelihood of an error in alignment, depending on the specific method of alignment. If the protrusion 5z protrudes upward or downward, for example, when a suction nozzle that has picked up the capacitor 1 is lowered toward a circuit board, which is not illustrated, the likelihood that the external electrode 5 will receive an unintended force from the circuit board (or the bonding material therebetween) due to the protrusion 5z is higher. In addition or alternatively, a reaction force that the external electrode 5 receives from the circuit board via the bonding material (e.g., solder) is relatively larger at the protrusion 5z. As a result, there is a higher likelihood of cracking occurring near the protrusion 5z, for example.

However, in the capacitor 1 according to an embodiment, since condition A is satisfied, the likelihood of the protrusion 5z being formed is reduced, and consequently, the likelihood of the inconveniences described above occurring is reduced.

Effects related to the external electrodes 5 have been exemplified above, but other effects can also be achieved. For example, if condition A is satisfied, the likelihood of the −D1-side edge of the base electrode 16 constituting a sharp ridge of the body 3 is reduced, and therefore, the likelihood of stress being concentrated at the −D1-side edge of the base electrode 16 is reduced, and consequently the strength of the body 3 is improved. For example, the force applied in the D3 direction to the −D1 side edge of the base electrode 16 will be supported by all the internal electrodes 9 (and dielectric layers 7). From another perspective, the strength of the body 3 is improved.

The capacitor 1 may further includes a second cover (e.g., cover 13 on the −D3 side) and a second base electrode (e.g., base electrode 16 on the −D3 side). The cover 13 on the −D3 side may overlap the effective part 11 from a second side (−D3 side). The base electrode 16 on the −D3 side may overlap the cover 13 on the −D3 side from the second side (−D3 side). The thickness from the surface on the first side (+D3 side) of the base electrode 16 on the +D3 side to the surface on the −D3 side of the base electrode 16 on the −D3 side (thickness of the body 3) may be 0.2 mm or less.

In this case, for example, since the body 3 is relatively thin, chamfering the ridges of the body 3 by barrel polishing is more difficult. As a result, the ridges of the body 3 tend to be sharply pointed. Consequently, there is a higher likelihood that the protrusion 5z will be formed on the external electrode 5 or that stress will become concentrated at a ridge of the body 3. In other words, there is a high demand for the effects of condition A. In other words, condition A is useful.

The total thickness of the cover 13 on the +D3 side and the base electrode 16 on the +D3 side may be 10% or more of the thickness from the +D3-side surface of the base electrode 16 on the +D3 side to the −D3-side surface of the base electrode 16 on the −D3 side (thickness of the body 3).

In this case, for example, the fact that the covers 13 are relatively thick allows the thickness of the body 3 to be made greater compared to the thickness of the effective part 11. As a result, the ridges of the body 3 become easier to chamfer by barrel polishing, for example. Therefore, condition A is easier to satisfy.

The thickness of the base electrode 16 on the +D3 side may be ½ or less of the thickness of the cover 13 on the +D3 side.

In this case, for example, since the thickness of the base electrode 16 is relatively small, the size of a ridge of an edge of the base electrode 16 is also relatively small. In turn, the effect of the ridge of the base electrode 16 on the formation of the external electrode 5 is reduced, and together with the effect of condition A, the likelihood of an unintended protrusion 5z being formed on the external electrode 5 is reduced.

As illustrated in FIG. 4, the end surface 11c may include the recessed portion 11d that is recessed toward the fourth side (+D1). At least some of the exposed edges 9c may be located at different positions from each other in the first direction (D1 direction) as a result of being located at the recessed portion 11d.

In this case, for example, the ridges of the body 3 are more likely to become sharply pointed due to the recessed portion 11d. Consequently, there is a higher likelihood that the protrusion 5z will be formed or stress will become concentrated at a ridge of the body 3. In other words, there is a high demand for the effects of condition A. In other words, condition A is useful. In addition, by providing the recessed portion 11d, the film deposition area of the external electrode 5 can be increased without increasing the external dimensions, and consequently the reliability of the connections between the external electrode 5 and the internal electrodes 9 can be improved.

As illustrated in FIG. 5, the end surface 11c may include the protruding portion 11e that protrudes toward the third side (−D1 side). At least some of the exposed edges 9c may be located at different positions from each other in the first direction (D1 direction) as a result of being located at the protruding portion 11e.

In this case, for example, the combination of protruding portion 11e and condition A facilitates making the surface from the end surface 11c to the edge of the base electrode 16 via the side surface of the cover 13 (the side surface of the body 3) become a smooth curved surface that protrudes outwards. As a result, the metal layer (e.g., external electrode 5) is more easily deposited on the side surface of the body 3. Consequently, the reliability of the connections between the external electrode 5 and the internal electrodes 9 is improved.

The capacitor 1 may further include the external electrode 5 that overlaps the +D3 side base electrode 16 from the +D3 side and overlaps the end surface 11c and contacts the exposed edges 9c.

In this case, for example, the structure and manufacturing process are simplified because the external electrode 5 is formed directly on the end surface 11c without forming a base electrode on the end surface 11c. The fact that a base electrode is not provided on the end surface 11c means that the side surface of the body 3 on the −D1 side will shift toward the +D1 side (to the position of the end surface 11c) by an amount equivalent to the thickness of the base electrode. From another perspective, the edge of the base electrode 16 on the −D1 side moves closer to the −D1 side of the body 3. As a result, the ridges of the body 3 are more likely to be sharp. In other words, there is a high demand for the effects of condition A. In other words, condition A is useful. In addition, a mode in which a base electrode is formed on the end surface 11c may also be included in a technology of the present disclosure.

The cover 13 may include multiple insulating layers 17 stacked in the stacking direction (D3 direction) and the dummy electrodes 20 positioned between the multiple insulating layers 17.

Condition A, for example, causes the base electrode 16 to move away from the side surface of the cover 13. As a result, for example, the strength of the cover 13 may be reduced and/or the adherence of the external electrode 5 to the side surface of the cover 13 may be reduced. However, such an inconvenience can be compensated for by providing the dummy electrodes 20.

L represents the maximum length of the effective part 11 in the first direction (D1 direction). W represents the maximum length of the effective part 11 in the second direction (D2 direction) perpendicular to the stacking direction (D3 direction) and the D1 direction. In this case, both L and W may be 0.030 mm or more and 0.200 mm or less. L/W may be 0.5 or more and 2.0 or less. The L and W of the effective part 11 are roughly the same as the L and W of the body 3 in an embodiment.

In this case, for example, because L and W are relatively small, chamfering the ridges formed by the side surfaces of the body 3 by barrel polishing is difficult. Consequently, the corners where the ridges between the side surfaces and the ridges between the top surface (or bottom surface) and the side surfaces intersect tend to be sharply pointed. Therefore, there is a higher likelihood that the protrusion 5z will be formed at the corners or that stress will become concentrated at the corners. In other words, there is a high demand for the effects of condition A. In other words, condition A is useful.

From another perspective, a multilayer electronic component (capacitor 1) according to an embodiment includes the effective part 11, a first cover (for example, the cover 13 on the +D3 side), and a first base electrode (for example, the base electrode 16 on the +D3 side). The effective part 11 includes the dielectric layers 7 and the internal electrodes 9 stacked in an alternating manner in the stacking direction (D3 direction). The cover 13 on the +D3 side overlaps the effective part 11 from the +D3 side out of a first side (e.g., +D3 side) and a second side (e.g., −D3 side) in the D3 direction. The +D3 side base electrode 16 overlaps the +D3-side cover 13 from the +D3 side. The effective part 11 has the end surface 11c that faces toward the −D1 side out of a third side (e.g., −D1 side) and a fourth side (+D1 side) of a first direction (e.g., D1 direction) that intersects the D3 direction. The multiple internal electrodes 9 include two or more internal electrodes (for example, first internal electrodes 9A), each having an exposed edge 9c that is exposed from the end surface 11c. The +D3-side base electrode 16 is located on a −D1-side region (with respect to the center) of the +D3-side surface of the +D3-side cover 13 (i.e., the −D1-side edge of the base electrode 16 described below is not the edge, toward the center of the cover 13 in the D1 direction, of the base electrode 16 located in the +D1-side region.). The −D1-side first end surface (end surface 16c) of the base electrode on the +D3 side is inclined with respect to the D1 direction in a direction such that the first end surface approaches the +D1 side while approaching the +D3 side (previously described "condition C" is satisfied).

Therefore, for example, the likelihood of the protrusion 5z being formed on the external electrode 5 is reduced, as described in the overview of embodiments. Specifically, for example, the ridges of the body 3 are less likely to be sharp than in a case where the end surface 16c is parallel to the D3 direction or inclined with respect to the D3 direction in an opposite manner to as in an embodiment. As a result, the likelihood of the protrusion 5z forming is reduced by the same or a similar action as when condition A is satisfied. Since the ridges of the body 3 are less likely to be sharp, the formed plating thickness can be made uniform, and this results in the external electrode 5 being formed with a uniform thickness.

In addition, for example, the fact that the end surface 16c of the base electrode 16 on the +D3 side is inclined as described above means that, when considering the intersection between the end surface 16c and the top surface of the base electrode 16 (+D3 side surface) as a reference point, the bottom surface of the base electrode 16 is closer to the exposed edge 9c of the internal electrode 9 (and the edge of the dummy electrode 20). As a result, the plating layer deposited at the exposed edges 9c and the plating layer deposited at the base electrode 16 are more easily connected to each other. This, for example, reduces the need for a base layer on the end surface 16c (although such a base layer may be provided). Furthermore, the plating deposition time can be shortened because the plating layer deposited at the exposed edges 9c can easily grow up to the bottom surface of the base electrode 16. On the other hand, the strength of the base electrode 16 can be secured compared to a case in which the entire base electrode 16 is made thinner.

The inclination angle θ of the first end surface (end surface 16c) with respect to the first direction (D1 direction) may be smaller than 45°.

In this case, for example, the end surface 16c can be said to be sufficiently inclined with respect to the D3 direction, and this improves the effects described above. The inclination angle θ may be greater than 5°.

In this case, for example, in the range of the length of the end surface 16c in the D1 direction, a case in which a thin portion extends over a relatively long range in the D1 direction is avoided. As a result, for example, the effect of reinforcing the body 3 by the base electrode 16 is improved.

The first base electrode (+D3-side base electrode 16) may be thicker than the internal electrodes 9.

In this case, for example, the end surface 16c is more easily made inclined. Specifically, in the length range of the end surface 16c in the D1 direction, the smaller the inclination angle θ, the smaller the change in thickness of the base electrode 16 with respect to the change in position in the D1 direction. If the base electrode 16 is thin, achieving such minute changes in the thickness of the base electrode 16 is difficult. When the base electrode 16 is thicker, any inclination angle θ is more easily realized. For example, as a result of the base electrode 16 being thicker than the internal electrodes 9, the strength of the capacitor 1 can be improved by the base electrode 16 while increasing the density of the stacked multiple internal electrodes 9 to increase the capacitance of the capacitor 1.

The capacitor 1 may include a second cover (cover 13 on the −D3 side) that overlaps the effective part 11 from the second side (−D3 side). The thickness of the first base electrode (the base electrode 16 on the +D3 side) may be at least 0.06 times the thickness from first side (+D3 side) surface of the first cover (+D3-side cover 13) to the −D3-side surface of the cover 13 on the −D3 side.

In this case, for example, similarly to as described above, realizing any inclination angle θ (particularly small values) becomes easier. For example, the base electrode 16 being relatively thick makes securing the thickness of the body 3 and chamfering the ridges of the body 3 by barrel polishing easier. Therefore, for example, the end surface 16c is more easily made inclined.

The base electrode 16 may contain a ceramic material.

In this case, for example, the strength of the base electrode 16 against polishing etc. is improved. As a result, the likelihood of the base electrode 16 being excessively abraded when subjected to barrel polishing, for example, is reduced. For example, if the strength of the base electrode 16 against polishing is low, the end portion of the base electrode 16 may be ground away across the entire thickness thereof, and an inclined surface might not be formed on the end surface 16*c*. The likelihood of such an inconvenience occurring can be reduced.

The volume percentage of ceramic material in the base electrodes 16 may be greater than the volume percentage of ceramic material in the internal electrodes 9 (may be 0 vol %).

In this case, for example, while achieving the above-described effects for the base electrodes 16, the conductivity of the internal electrodes 9 can be improved and the electrical characteristics of the capacitor 1 can be improved.

At least some (two or more) of the multiple exposed edges 9*c* may be at different positions from each other in the first direction (D1 direction). The position of the exposed edge 9*c* located farthermost toward the third side (−D1 side), among the multiple exposed edges 9*c*, is referred to as the outermost position P2. In this case, the −D1-side edge of the base electrode 16 may be positioned farther toward the fourth side (+D1 side) than the outermost position P2 (above-described condition B may be satisfied).

In this case, the likelihood of the protrusion 5*z* forming is reduced by the same or a similar action as when the above-described condition A is satisfied. The above effects are improved by the combination of condition B and the inclination of the end surface 16*c* of the base electrode 16.

Technologies according to the present disclosure are not limited to the above embodiments and may be implemented in the form of various modes.

For example, a multilayer electronic component is not limited to a capacitor. For example, in a multilayer electronic component, some of multiple internal electrodes may constitute a capacitor and other internal electrodes may constitute an inductor or resistor. The multilayer electronic component may then constitute an appropriate circuit (for example, a resonance circuit) as a whole. A cover, a base electrode, and an external electrode may be provided on only one of the top surface and the bottom surface of the effective part.

What is claimed is:

1. A multilayer electronic component comprising:
    an effective part including dielectric layers and internal electrodes stacked in an alternating manner in a stacking direction;
    a first cover overlapping the effective part from a first side, among a first side and a second side, in the stacking direction; and
    a first base electrode overlapping the first cover from the first side,
    wherein the effective part has an end surface facing a third side, among a third side and a fourth side, in a first direction intersecting the stacking direction,
    a plurality of the internal electrodes includes two or more internal electrodes that each include an exposed edge exposed from the end surface,
    at least some of the exposed edges are located at different positions from each other in the first direction,
    the first base electrode is located in a region, on the third side, of a surface of the first cover on the first side, and
    when a position of the exposed edge located farthest toward the fourth side, among the plurality of exposed edges, is referred to as an innermost position, an edge, on the third side, of the first base electrode is located at an identical position in the first direction to the innermost position or farther toward the fourth side than the innermost position,
    wherein the first base electrode contains a ceramic material, and wherein a volume percentage of the ceramic material in the first base electrode is greater than a volume percentage of the ceramic material in the internal electrodes.

2. The multilayer electronic component according to claim 1,
    wherein a first end surface, on the third side, of the first base electrode is inclined with respect to the stacking direction in a direction such that the first end surface approaches the fourth side while approaching the first side.

3. The multilayer electronic component according to claim 1, further comprising:
    a second cover overlapping the effective part from the second side; and
    a second base electrode overlapping the second cover from the second side,
    wherein a thickness from a surface, on the first side, of the first base electrode to a surface, on the second side, of the second base electrode is 0.2 mm or less.

4. The multilayer electronic component according to claim 1, further comprising:
    a second cover overlapping the effective part from the second side; and
    a second base electrode overlapping the second cover from the second side,
    wherein a total thickness of the first cover and the first base electrode is 10% or more of a thickness from a surface, on the first side, of the first base electrode to a surface, on the second side, of the second base electrode.

5. The multilayer electronic component according to claim 1,
    wherein a thickness of the first base electrode is ½ or less of a thickness of the first cover.

6. The multilayer electronic component according to claim 1,
    wherein the end surface includes a recessed portion that is recessed toward the fourth side, and
    at least some of the exposed edges are located at different positions from each other in the first direction due to being located at the recessed portion.

7. The multilayer electronic component according to claim 1,
    wherein the end surface includes a protruding portion that protrudes toward the third side, and
    at least some of the exposed edges are located at different positions from each other in the first direction due to being located at the protruding portion.

8. The multilayer electronic component according to claim 1, further comprising:
    an external electrode that overlaps the first base electrode from the first side, and overlaps the end surface and contacts the exposed edges.

9. The multilayer electronic component according to claim 1,
    wherein the first cover includes
        a plurality of insulating layers stacked in the stacking direction, and
        a dummy electrode positioned between the plurality of insulating layers.

10. The multilayer electronic component according to claim 1,
    wherein when L represents a maximum length of the effective part in the first direction and W represents a maximum length of the effective part in a second direction, the second direction being perpendicular to the stacking direction and the first direction, L and W are both 0.030 mm or more and 0.200 mm or less, and L/W is 0.5 or more and 2.0 or less.

11. The multilayer electronic component according to claim 2, wherein an angle of inclination of the first end surface with respect to the first direction is smaller than 45°.

12. The multilayer electronic component according to claim 2, wherein the angle of inclination is greater than 5°.

13. The multilayer electronic component according to claim 1, wherein the first base electrode is thicker than each of the internal electrodes.

14. The multilayer electronic component according to claim 1, further comprising:

a second cover overlapping the effective part from the second side, wherein a thickness of the first base electrode is 0.06 times or more a thickness from a surface, on the first side, of the first cover to a surface, on the second side, of the second cover.

15. A multilayer electronic component comprising:

an effective part including dielectric layers and internal electrodes stacked in an alternating manner in a stacking direction;

a first cover overlapping the effective part from a first side, among a first side and a second side, in the stacking direction; and a first base electrode overlapping the first cover from the first side, wherein the effective part has an end surface facing a third side, among a third side and a fourth side, in a first direction intersecting the stacking direction, a plurality of the internal electrodes includes two or more internal electrodes that each include an exposed edge exposed from the end surface, the first base electrode is located in a region, on the third side, of a surface of the first cover on the first side, and a first end surface, on the third side, of the first base electrode is inclined with respect to the stacking direction in a direction such that the first end surface approaches the fourth side while approaching the first side, wherein the first base electrode contains a ceramic material, and wherein a volume percentage of the ceramic material in the first base electrode is greater than a volume percentage of the ceramic material in the internal electrodes.

16. The multilayer electronic component according to claim 15, wherein at least some of the exposed edges are located at different positions from each other in the first direction, and when a position of the exposed edge located farthest toward the third side, among the plurality of exposed edges, is referred to as an outermost position, an edge, on the third side, of the first base electrode is located farther toward the fourth side than the outermost position.

17. The multilayer electronic component according to claim 15, further comprising:

an entire arrangement region of the first base electrode located on the surface of the first cover on the first side, and a region where none of the plurality of base electrodes are arranged on the surface of the first cover on the first side, wherein the entire arrangement region of the first base electrode located on the surface of the first cover on the first side is located on the second side relative to the region where none of the plurality of base electrodes are arranged.

18. The multilayer electronic component according to claim 15, wherein a first end surface and a second end surface of the first cover, located on the third side, form an inclined surface, and the inclined surface is a continuous surface that is inclined with respect to the stacking direction in a direction such that the continuous surface approaches the fourth side while approaching the first side over an entire thickness of the first base electrode and an entire thickness of the first cover.

19. The multilayer electronic component according to claim 15, wherein an angle of inclination of the first end surface with respect to the first direction is smaller than 45°.

20. The multilayer electronic component according to claim 15, wherein the angle of inclination is greater than 5°.

* * * * *